(12) United States Patent
Lee

(10) Patent No.: US 8,941,619 B2
(45) Date of Patent: Jan. 27, 2015

(54) APPARATUS AND METHOD FOR CONTROLLING INFORMATION DISPLAY

(75) Inventor: Fang-Ching Lee, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 520 days.

(21) Appl. No.: 13/300,081

(22) Filed: Nov. 18, 2011

(65) Prior Publication Data

US 2013/0127783 A1    May 23, 2013

(51) Int. Cl.
*G06F 3/041*    (2006.01)
*G06F 3/043*    (2006.01)

(52) U.S. Cl.
CPC ...... *G06F 3/043* (2013.01); *G06F 2203/04101* (2013.01)
USPC ........... 345/175; 345/173; 345/174; 345/176; 345/178; 345/179; 345/180; 178/18.01; 178/18.02; 178/18.03

(58) Field of Classification Search
USPC ............................... 345/173–175; 178/18.01
See application file for complete search history.

(56) References Cited

U.S. PATENT DOCUMENTS

| 6,087,599 | A | 7/2000 | Knowles |
| 6,229,529 | B1 * | 5/2001 | Yano et al. ............... 345/175 |
| 6,536,275 | B1 | 3/2003 | Durkee et al. |
| 7,302,156 | B1 * | 11/2007 | Lieberman et al. ........... 385/146 |
| 8,456,418 | B2 * | 6/2013 | Ung et al. ...................... 345/158 |
| 8,576,182 | B2 * | 11/2013 | Hristov ......................... 345/173 |

(Continued)

FOREIGN PATENT DOCUMENTS

| CN | 1199889 A | 11/1998 |
| TW | 201112049 | 4/2011 |

(Continued)

*Primary Examiner* — Grant Sitta
(74) *Attorney, Agent, or Firm* — Tim Tingkang Xia, Esq.; Morris, Manning & Martin, LLP

(57) ABSTRACT

A display for controlling information display. In one embodiment, the display has a display panel having a display area for displaying information and a peripheral portion surrounding the display area, a plurality of acoustic/ultrasonic transducers, $\{X_i\}$, arranged at a plurality of selected locations in the peripheral portion, each acoustic/ultrasonic transducer $X_i$ being configured to transmit a first signal $S1_i$ with frequency band $f_i$ in a first duration, $\Delta t_{di}$, and to receive a second signal $S2_i$ in a second duration, $\Delta T_{di}$, periodically at each period, where the second signal $S2_i$ is reflected from the first signal $S1_i$ by at least one object, and a processor in communication with the plurality of acoustic/ultrasonic transducers $\{X_i\}$ for processing the received second signals $\{S2_i\}$ from the plurality of acoustic/ultrasonic transducers $\{X_i\}$ to determine a location and a gesture of the at least one object relative to the display area.

9 Claims, 18 Drawing Sheets

(56) References Cited

U.S. PATENT DOCUMENTS

| | | |
|---|---|---|
| 2001/0006006 A1* | 7/2001 | Hill ................................ 73/606 |
| 2006/0040739 A1 | 2/2006 | Wells |
| 2006/0274906 A1 | 12/2006 | Jia et al. |
| 2008/0005703 A1 | 1/2008 | Radivojevic et al. |
| 2008/0100572 A1 | 5/2008 | Boillot |
| 2008/0266266 A1* | 10/2008 | Kent et al. .................... 345/173 |
| 2009/0235750 A1 | 9/2009 | Chang et al. |
| 2011/0050620 A1* | 3/2011 | Hristov ......................... 345/174 |
| 2011/0221706 A1* | 9/2011 | McGibney et al. ........... 345/175 |
| 2012/0068973 A1* | 3/2012 | Christiansson et al. ...... 345/175 |
| 2012/0105380 A1* | 5/2012 | Morrison ..................... 345/175 |
| 2012/0200417 A1* | 8/2012 | Jin ............................... 340/635 |
| 2012/0206339 A1 | 8/2012 | Dahl |
| 2012/0212458 A1* | 8/2012 | Drumm ........................ 345/175 |
| 2012/0249479 A1* | 10/2012 | Chtchetinine et al. ....... 345/175 |
| 2012/0299877 A1* | 11/2012 | Huang et al. ................. 345/175 |
| 2012/0313900 A1 | 12/2012 | Dahl |
| 2012/0327034 A1* | 12/2012 | Dominici et al. ............. 345/175 |
| 2012/0327039 A1* | 12/2012 | Kukulj .......................... 345/175 |
| 2013/0201142 A1* | 8/2013 | Suarez Rovere ............. 345/173 |

FOREIGN PATENT DOCUMENTS

| | | |
|---|---|---|
| WO | 2011004135 A1 | 1/2011 |
| WO | 2011042749 A1 | 4/2011 |

* cited by examiner

APPARATUS AND METHOD FOR CONTROLLING INFORMATION DISPLAY

FIELD OF THE INVENTION

The present invention relates generally to object detection, and more particularly to acoustic/ultrasonic based display apparatus, arrangements of acoustic/ultrasonic transducers for object detection in screen content/information control and methods for controlling information display.

BACKGROUND OF THE INVENTION

Touch sensing technology capable of providing a natural interface between an electronic system and user has found widespread applications in a variety of fields, for example, in mobile phones, personal digital assistants (PDAs), automatic teller machines (ATMs), game machines, medical devices, liquid crystal display (LCD) devices, light emitting diode (LED) devices, plasma display panel (PDP) devices, computing devices, and the like, where a user may input desired information and/or operate the electronic system through a touch sensing device associated with the electronic system.

There are different types of touch sensing devices available for detection of a touch location. One is of capacitive or resistive touch sensor systems that utilize analog capacitive or resistive touch sensing techniques to identify pointer contacts on the touch panel. The capacitive and resistive touch sensing techniques are adapted only for 2D touch detections of flat touch panels. Although the capacitive sensing technique is capable of detecting multiple touches simultaneously, such detections are not effective on large touch areas, but expensive.

Another is of camera-based touch detection systems that use optical recording devices such as cameras to acquire images of a touch panel surface from different locations and process the acquired images to determine touch positions and gestures. However, the existing image processing technique has very strict requirements to the surrounding environment such as background and ambient light strength. For example, if the ambient light is too dark, extra light needs being provided. Otherwise, infrared cameras are needed to acquire the images. In addition, identification of gestures in complex background is also long-felt need but difficult to solve. Furthermore, the use of cameras increases manufacturing cost and complexity.

Acoustic or ultrasonic touch detection systems are also available, which utilize reflected acoustic or ultrasonic waves from a finger or object to detect the position of the finger or object, even identify the gesture or movement of the finger or object, so as to control the touch panel to display desired contents thereon.

Therefore, a heretofore unaddressed need exists in the art to address the aforementioned deficiencies and inadequacies.

SUMMARY OF THE INVENTION

In one aspect of the present invention, a display with command input function includes a display panel for displaying information, the display panel having a display area and a peripheral portion around the display area, and a plurality of acoustic/ultrasonic transducers, $\{X_i\}$, arranged at a plurality of selected locations in the peripheral portion, i=1, 2, 3, . . . N, N being an positive integer, where each acoustic/ultrasonic transducer $X_i$ comprises a transmitter for transmitting a first signal $S1_i$ with a frequency band $f_i$ and a receiver for receiving a second signal $S2_i$ that is reflected from the first signal $S1_i$ by at least one object, a microcontroller in communication with the plurality of acoustic/ultrasonic transducers $\{X_i\}$ for generating a control signal having a period of time, T, to drive the transmitter of each acoustic/ultrasonic transducer to transmit the first signal $S1_i$ with the frequency band $f_i$ in a first duration, $\Delta t_{di}$, and the receiver of each acoustic/ultrasonic transducer to receive the second signal $S2_i$ in a second duration, $\Delta T_{di}$, periodically at each period, and a processor coupled with the microcontroller for processing the received second signals $\{S2_i\}$ from the plurality of acoustic/ultrasonic transducers $\{X_i\}$ to determine a location and a gesture of the at least one object relative to the display area.

In another aspect, the present invention relates to a display with command input function. In one embodiment, the display has a display panel for displaying information, the display panel having a display area and a peripheral portion around the display area, a plurality of acoustic/ultrasonic transducers, $\{X_i\}$, arranged at a plurality of selected locations in the peripheral portion, i=1, 2, 3, . . . N, N being an positive integer, where each acoustic/ultrasonic transducer $X_i$ is configured to transmit a first signal $S1_i$ in a first duration, $\Delta t_{di}$, and to receive a second signal $S2_i$ in a second duration, $\Delta T_{di}$, periodically at each period, where the second signal $S2_i$ that is reflected from the first signal $S1_i$ by at least one object, and a processor in communication with the plurality of acoustic/ultrasonic transducers $\{X_i\}$ for processing the received second signals $\{S2_i\}$ from the plurality of acoustic/ultrasonic transducers $\{X_i\}$ to determine a location and a gesture of the at least one object relative to the display area.

In yet another aspect, the present invention relates to a method for controlling a display with command input function, the display having a display panel having a display area and a peripheral portion around the display area, and a plurality of acoustic/ultrasonic transducers, $\{X_i\}$, arranged at a plurality of selected locations in the peripheral portion, i=1, 2, 3, . . . N, N being an positive integer. The method in one embodiment, includes the steps of providing a control signal to drive the plurality of acoustic/ultrasonic transducers $\{X_i\}$ so that each acoustic/ultrasonic transducer $X_i$ transmits a first signal $S1_i$ with a frequency band $f_i$ in a first duration, $\Delta t_{di}$, and receives a second signal $S2_i$ in a second duration, $\Delta T_{di}$ periodically at each period, where the second signal $S2_i$ that is reflected from the first signal $S1_i$ by at least one object, collecting the received second signal $S2_i$ of each acoustic/ultrasonic transducer $X_i$, processing the collected second signal $S2_i$ from each acoustic/ultrasonic transducer $X_i$ to determine a location and a gesture of the at least one object relative to the display area, and displaying desired information in the display area according to the determined location and gesture of the at least one object.

In a further aspect, the present invention relates to an arrangement of acoustic/ultrasonic transducers for object detections in screen content control in a display panel. In one embodiment, the arrangement includes a plurality of acoustic/ultrasonic transducers, $\{X_i\}$, i=1, 2, 3, . . . N, N≥4, each acoustic/ultrasonic transducer $X_i$ having a blind area. The plurality of acoustic/ultrasonic transducers $\{X_i\}$ is spatially arranged in one or more sonar bars detachably attached to a periphery of the display panel to define an acoustic/ultrasonic transducer array such that the blind areas of at least four acoustic/ultrasonic transducers of the acoustic/ultrasonic transducer array are un-overlapped. When an object to be detected is in the blind area of one acoustic/ultrasonic transducer, at least three of the un-overlapped acoustic/ultrasonic transducers are capable of detecting respective distances between the object and the at least three of the un-overlapped acoustic/ultrasonic transducers so as to determine a location and/or gesture of the object relative to the display panel.

In yet a further aspect, the present invention relates to a method for object detections in screen content control in a display panel. In one embodiment, the method comprises the step of spatially arranging a plurality of acoustic/ultrasonic transducers, $\{X_i\}$, in one or more sonar bars detachably attached to a periphery of the display panel to define an acoustic/ultrasonic transducer array, i=1, 2, 3, . . . N, N≥4, each acoustic/ultrasonic transducer $X_i$ having a blind area, such that the blind areas of at least four acoustic/ultrasonic transducers of the acoustic/ultrasonic transducer array are un-overlapped, whereby when an object to be detected is in the blind area of one acoustic/ultrasonic transducer, at least three of the un-overlapped acoustic/ultrasonic transducers are capable of detecting respective distances between the object and the at least three of the un-overlapped acoustic/ultrasonic transducers so as to determine a location and/or gesture of the object relative to the display panel.

The method also comprises the steps of configuring at least one of the plurality of acoustic/ultrasonic transducers $X_i$ to transmit a first signal $S1_i$, and each of the plurality of acoustic/ultrasonic transducers $X_i$ to receive a second signal $S2_i$ that is reflected from the first signal $S1_i$ by the object, processing the received second signals $\{S2_i\}$ to determine a location, movement and/or gesture of the object relative to the display area, and displaying desired information in the display panel according to the determined location, movement and/or gesture of the object.

In one aspect, the present invention relates to a sonar bar used for object detections in screen content control in a display panel. In one embodiment, the sonar bar has one or more acoustic/ultrasonic transducers, each acoustic/ultrasonic transducer having a blind area, and an enclosure for enclosing the at least one acoustic/ultrasonic transducer, having one or more shielding film or a shielding case for preventing electromagnetic interference (EMI) of the enclosed one or more acoustic/ultrasonic transducers with the display panel.

In use, one or more sonar bars are detachably attached to a periphery of the display panel to define an acoustic/ultrasonic transducer array such that the blind areas of at least four acoustic/ultrasonic transducers of the acoustic/ultrasonic transducer array are un-overlapped, whereby when an object to be detected is in the blind area of one acoustic/ultrasonic transducer, at least three of the un-overlapped acoustic/ultrasonic transducers are capable of detecting respective distances between the object and the at least three of the un-overlapped acoustic/ultrasonic transducers so as to determine a location and/or gesture of the object relative to the display panel.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
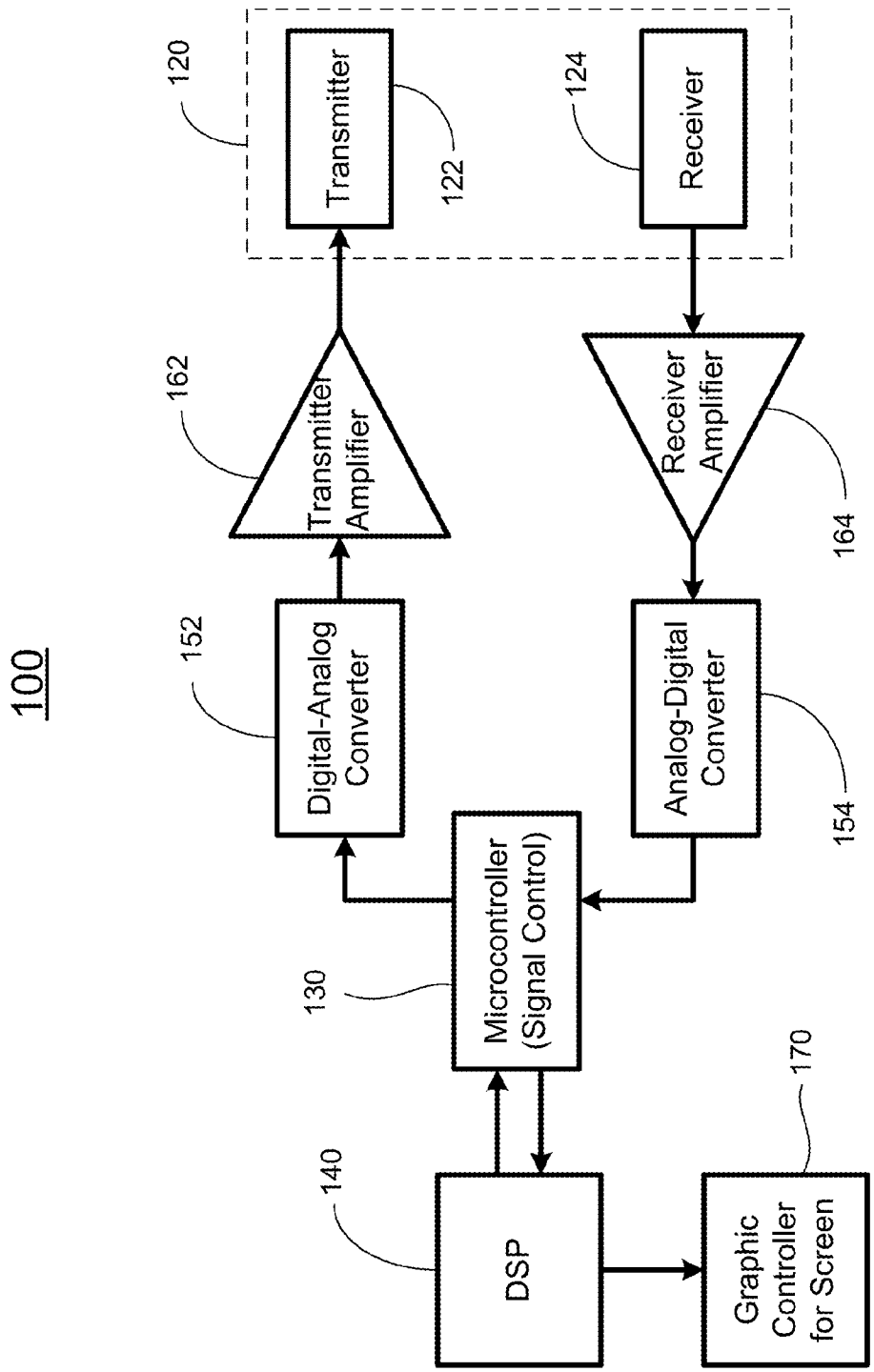
FIG. 1 shows schematically a display for controlling information display according to one embodiment of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

The description will be made as to the embodiments of the present invention in conjunction with the accompanying drawings in FIGS. 1 to 18. In accordance with the purposes of this invention, as embodied and broadly described herein, this invention, in one aspect, relates to a display with command input function and method of driving the same. In one embodiment, the display includes a display panel for displaying information, the display panel having a display area and a peripheral portion surrounding the display area, and a plurality of acoustic/ultrasonic transducers, $\{X_i\}$, arranged at a plurality of selected locations in the peripheral portion, i=1, 2, 3, ... N, N being an positive integer, where each acoustic/ultrasonic transducer $X_i$ comprises a transmitter for transmitting a first signal $S1_i$ with a frequency band $f_i$ and a receiver for receiving a second signal $S2_i$ that is reflected from the first signal $S1_i$ by at least one object. Each transducer $X_i$ may have an independent frequency band $f$; or the same frequency band $f_s$. If the transducer $X_i$ has the same frequency $f_s$, the starting time of each transducer could be synchronized with at least one transducer transmitting the first signal $S1_i$ with the frequency $f_s$. The at least one object can be a hand or a portion of the hand of a user for example. In one embodiment, the transmitter of each acoustic/ultrasonic transducer $X_i$ comprises a speaker, and the receiver of each acoustic/ultrasonic transducer $X_i$ comprises a microphone. At least one of the first signal $S1_i$ transmitted from each acoustic/ultrasonic transducer $X_i$ has a frequency $f_i$ that is identical to or substantially different from one another. In one embodiment, the first signal $S1_i$ has a frequency $f_i$ in a range of about 10-200 kHz.

The display also includes a microcontroller in communication with the plurality of acoustic/ultrasonic transducers $\{X_i\}$ for generating a control signal having a period of time, T, to drive the transmitter of each acoustic/ultrasonic transducer to transmit the first signal $S1_i$ with a frequency band $f_i$ in a first duration, $\Delta t_{di}$, and the receiver of each acoustic/ultrasonic transducer to receive the second signal $S2_i$ in a second duration, $\Delta T_{di}$, periodically at each period, and a processor coupled with the microcontroller for processing the received second signals $\{S2_i\}$ from the plurality of acoustic/ultrasonic transducers $\{X_i\}$ to determine a location and a gesture of the at least one object relative to the display area. In one embodiment, the control signal has a frequency in a range of about 10 Hz-500 kHz.

The display may further include an information displaying controller coupled with the processor and the display panel for displaying desired information in the display area according to the location and the gesture of the at least one object.

For each period of transducer $X_i$, the first duration $\Delta t_{di}$ is from an initial time, $t_{0i}$, to a first time, $t_{1i}$, of the period, and the second duration $\Delta T_{di}$ is from a third time, $t_{3i}=2\Delta T_i$, to a fourth time, $t_{4i}=2(\Delta T_i+\Delta t_{di})$, of the period, where $\Delta T_i=(t_{2i}-t_{0i})$ and determines an effective distance for the at least one object to be detected in the period, where $t_{4i}>t_{3i}>t_{2i}>t_{1i}>t_{0i}$. In one embodiment, $\Delta T_i$ of each period is different from that of its immediately prior period so as to define an effective detection range from the first effective detection distance detectable in the first period to the last effective detection distance detectable in the last period. For example, $\Delta T_i$ of any one but the first each period is longer than different from that of its immediately prior period so as to define an effective detection range from the first effective detection distance detectable in the first period to the last effective detection distance detectable in the last period.

In one embodiment, the control signal is adapted such that for each period, the transmitter of each acoustic/ultrasonic transducer $X_i$ is turned on to transmit the first signal $S1_i$ with a frequency band $f_i$ in the first duration $\Delta t_{di}$, and the receiver of each acoustic/ultrasonic transducer $X_i$ is turned on to receive the second signal $S2_i$ in the second duration $\Delta T_{di}$. Moreover, the acoustic/ultrasonic transducer $X_i$ is can turn off when the acoustic/ultrasonic transducer $X_i$ is not receiving and transmitting signal.

In one embodiment, the display also includes a digital-analog converter (DAC) coupled between the microcontroller and each acoustic/ultrasonic transducer $X_i$ for converting the control signal from a digital format into an analog format, and inputting the converted control signal to each acoustic/ultrasonic transducer $X_i$ so that the transmitter of each acoustic/ultrasonic transducer $X_i$ transmits the first signal $S1_i$ in the first duration $\Delta t_{di}$ and the receiver of each acoustic/ultrasonic transducer $X_i$ receives the second signal $S2_i$ in the second duration $\Delta T_{di}$ for each period.

In another embodiment, the display may includes a transmitter amplifier coupled between the digital-analog converter and each acoustic/ultrasonic transducer $X_i$ for amplifying the converted control signal and inputting the amplified control signal to each acoustic/ultrasonic transducer $X_i$.

In addition, the display may also include a receiver amplifier coupled to each acoustic/ultrasonic transducer $X_i$ for amplifying each second signal $S2_i$ received by the receiver of each acoustic/ultrasonic transducer $X_i$, and an analog-digital converter (ADC) coupled between the microcontroller and the receiver amplifier for converting each amplified second signal $S2_i$ from an analog format into a digital format and inputting each converted second signal $S2_i$ to the microcontroller.

In one embodiment, the display includes an application-specific integrated circuit (ASIC) having a first port and a second port coupled to the microcontroller, and a third port coupled to each acoustic/ultrasonic transducer $X_i$. The ASIC has a digital-analog converter (DAC) coupled between the first port and the third port for converting the control signal from a digital format into an analog format, and inputting the converted control signal to each acoustic/ultrasonic transducer $X_i$ so that the transmitter of each acoustic/ultrasonic transducer $X_i$ transmits the first signal $S1_i$ in the first duration $\Delta t_{di}$ and the receiver of each acoustic/ultrasonic transducer $X_i$ receives the second signal $S2_i$ in the second duration $\Delta T_{di}$ for each period, a receiver amplifier coupled to the third port for amplifying each second signal $S2_i$ received by the receiver of each acoustic/ultrasonic transducer $X_i$, and an analog-digital converter (ADC) coupled between the second port and the receiver amplifier for converting each amplified second signal $S2_i$ from an analog format into a digital format and inputting each converted second signal $S2_i$ to the microcontroller.

In one embodiment, the processor is configured to correlate each received second signal $S2_i$ from each acoustic/ultrasonic transducer $X_i$ to a matched filter using a sliding window protocol so as to obtain a distance, $d_i$, of the at least one object to each acoustic/ultrasonic transducer $X_i$. The distance $d_i$ of the at least one object to each acoustic/ultrasonic transducer $X_i$ satisfies the relationship of:

$$|X-X_i|^2 = X^T X - 2X_i^T X + X_i^T X_i = d_i^2,$$

where $X_i = [x_i \ y_i]^T$ is the position of the transducer $X_i$, and $X = [x \ y]^T$ is the position of the at least one object, where the position X of the at least one object is obtained from three transducers $X_1$, $X_2$ and $X_3$ located in a non-straight line, to be in the form of:

$$X = \frac{1}{2} \begin{bmatrix} (X_1 - X_2)^T \\ (X_2 - X_3)^T \end{bmatrix}^{-1} \cdot \begin{bmatrix} d_2^2 - d_1^2 + X_1^T X_1 - X_2^T X_2 \\ d_3^2 - d_2^2 + X_2^T X_2 - X_3^T X_3 \end{bmatrix}$$

In one embodiment, the processor comprises a computer.

Referring now to FIGS. 1 to 9, and particularly to FIG. 1 first, a display 100 with command input function is shown according to one embodiment of the present invention. In this embodiment, the display 100 includes a display panel 110 for displaying desired information responsively, a plurality of acoustic/ultrasonic transducers 120 for sensing locations and gestures (movements) of one or more objects that instruct or command information to be displayed, a microcontroller 130 for controlling the plurality of acoustic/ultrasonic transducers 120, and a digital signal processor (DSP) to process sensing signals detected by the plurality of acoustic/ultrasonic transducers 120 to determine the locations and gestures (movements) of one or more objects, and an information displaying controller 170 for controlling the display panel 110 to display the desired information according to the locations and gestures (movements) of one or more objects.

Figure 2:
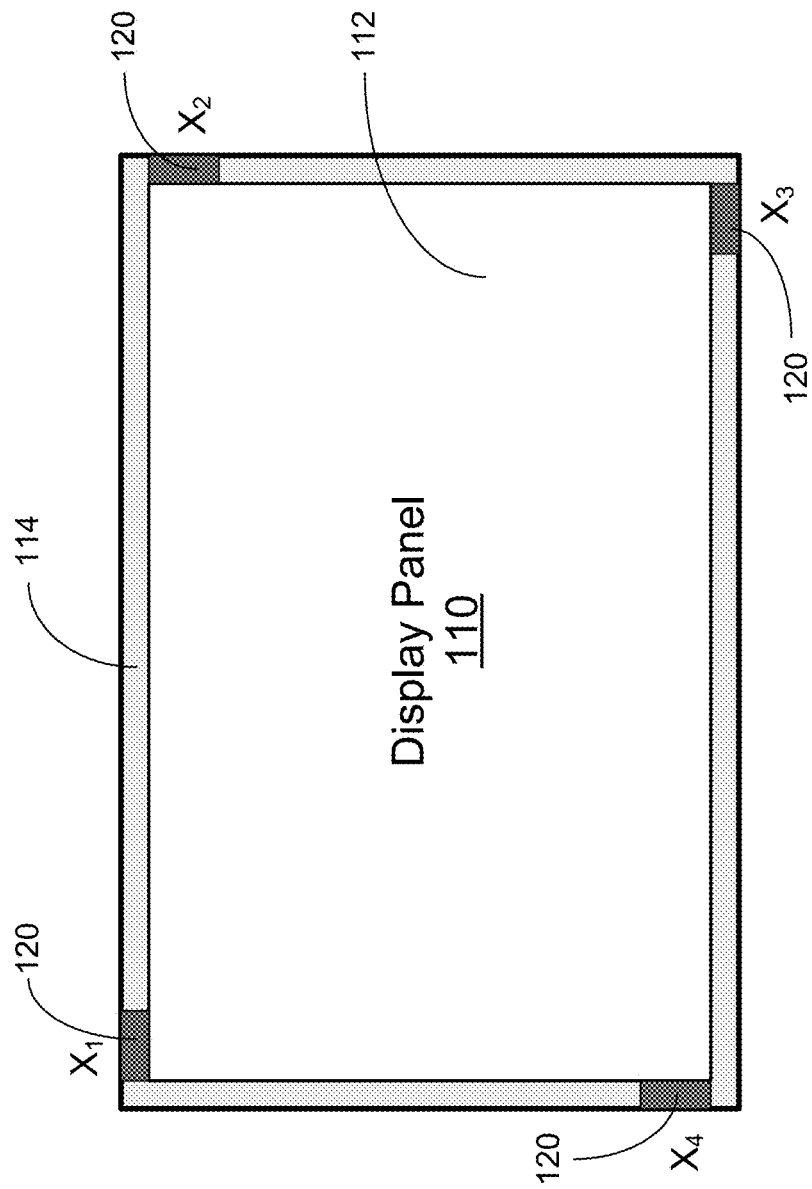
FIG. 2 shows schematically a display panel and transducers imbedded therein utilized in the display shown in FIG. 1.

As shown in FIG. 2, the display panel 110 has a display area 112 and a peripheral portion 114 surrounding the display area 112. The plurality of acoustic/ultrasonic transducers 120 ($\{X_i\}$) arranged at a plurality of selected locations in the peripheral portion 114 of the display panel 110, where i=1, 2, 3, . . . N, and N is an positive integer. In this exemplary embodiment, four (N=4) acoustic/ultrasonic transducers 120 ($X_1$, $X_2$, $X_3$ and $X_4$) are respectively imbedded in the four corners of the steel frame (peripheral portion) 114 of the display panel 110, with the transmitted/received surface of the acoustic/ultrasonic transducers 120 be on the top surface of the frame 114. Each transducer $X_i$ may have an independent frequency band $f_i$ or the same frequency band $f_s$. If the transducer $X_i$ has the same frequency $f_s$, the starting time of each transducer may be synchronized with at least one transducer transmitting the first signal $S1_i$ with the frequency $f_s$.

Figure 3:
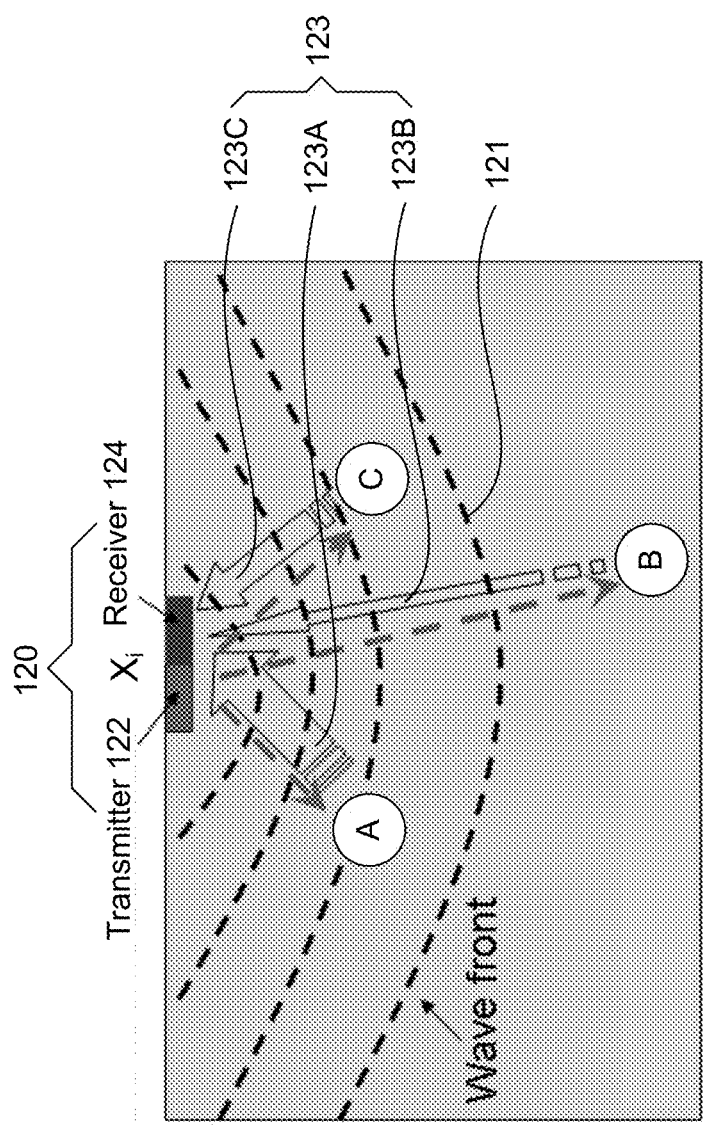
FIG. 3 shows schematically the transmission and reception of signals of a transducer according to one embodiment of the present invention.

As shown in FIG. 3, each acoustic/ultrasonic transducer 120 ($X_1$, $X_2$, $X_3$ or $X_4$) includes a transmitter 122 and a receiver 124. The transmitter 122 is configured to transmit a first, acoustic/ultrasonic signal 121 with a frequency $f_i$. When the wave front of the first signal $S1_i$ 121 meets one or more obstacles or objects, for example, three objects A, B and C shown in FIG. 3, the first signal $S1_i$ 121 is reflected back by each of the objects A, B and C. The reflected (second) acoustic/ultrasonic signal 123 is then received by the receiver 124. The reflected signal 123 includes the reflected signals 123A, 123B and 123C by the objects A, B and C, respectively. Based on the time differences and voltage differences between these reflected signals 123A, 123B and 123C, the location and/or the movement of each of the objects A, B and C can be determined. The one or more objects can be figures, hand or a portion of the hand of a user, or others.

Figure 4:
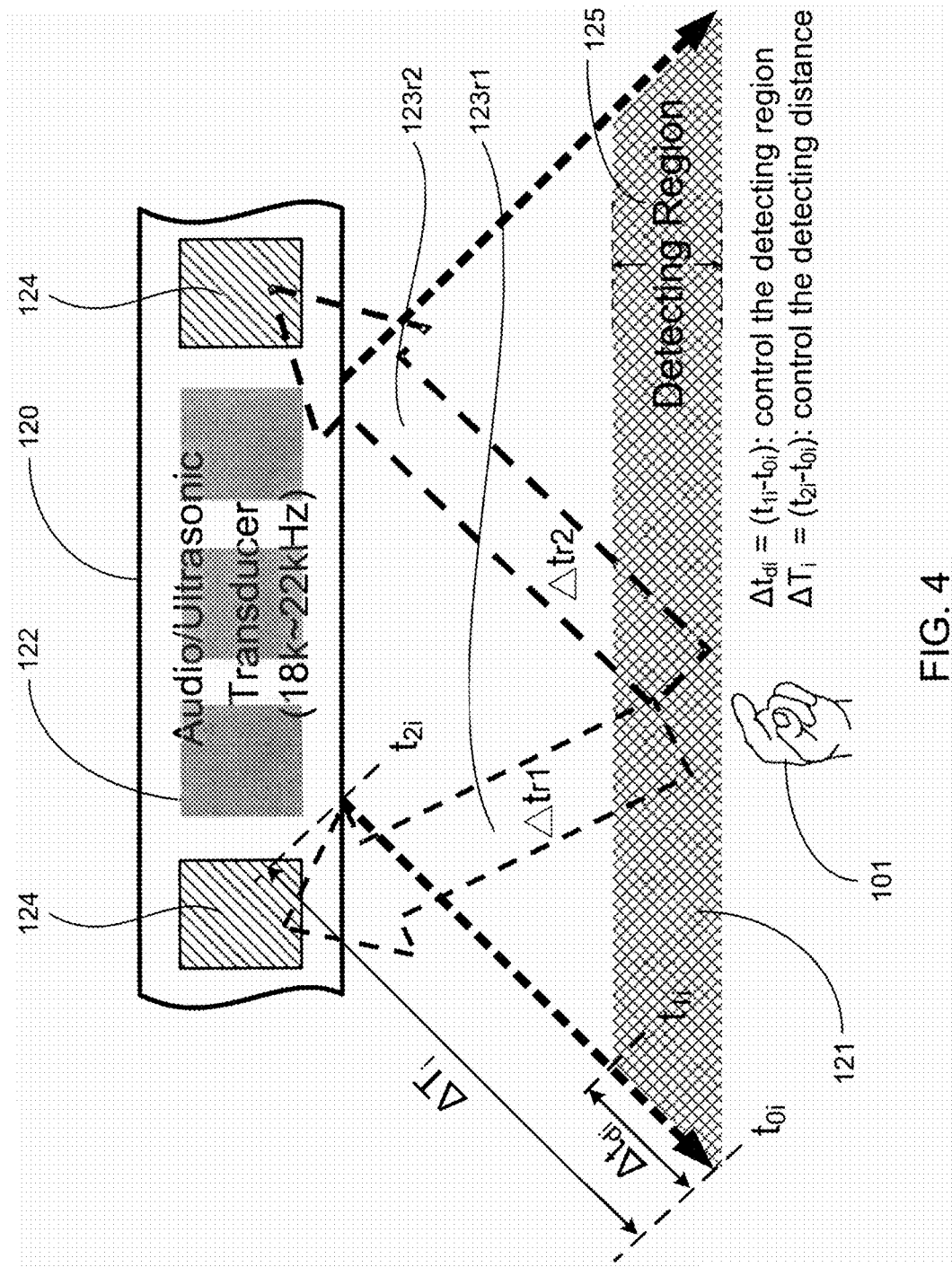
FIG. 4 shows schematically the transmission and reception of signals of a transducer according to another embodiment of the present invention.
Figure 5:
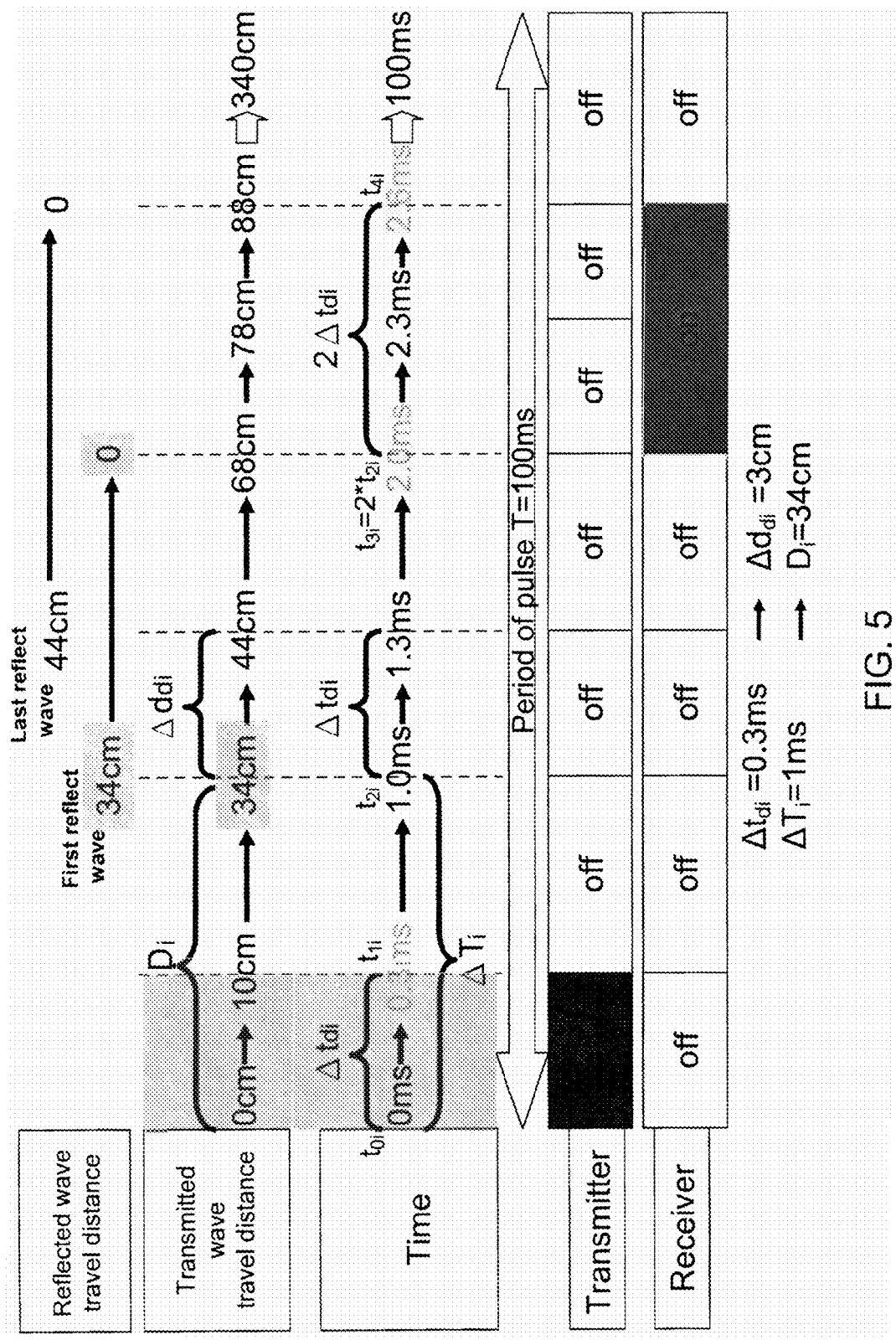
FIG. 5 shows schematically a time sequence control for a display for controlling information display according to one embodiment of the present invention.

In one embodiment, the acoustic/ultrasonic transducer 120 ($X_i$) is controlled to transmit a first acoustic/ultrasonic signal 121 in a first duration, $\Delta t_{1i}$, and to receive the second signal $S2_i$ 123 reflected from the objects in a second duration, $\Delta T_{di}$ periodically at each period, T. That is the first acoustic/ultrasonic signal 121 transmitted from the acoustic/ultrasonic transducer 120 is a pulse signal with the period T. The first duration $\Delta t_{di}$ and the second duration $\Delta T_{di}$ are predetermined. As shown in FIG. 4 and FIG. 5, the transmitter 122 of the acoustic/ultrasonic transducer 120 emits the acoustic/ultrasonic signal 121 in a first duration $\Delta t_{di}$ from an initial time, $t_{0i}$, to a first time, $t_{1i}$. The first duration $\Delta t_{di}$ defines a detecting region 125. When the acoustic/ultrasonic pulse signal 121 meets a hand of a user (object) 101, it is reflected back to the receiver 124 of the acoustic/ultrasonic transducer 120 in the second duration $\Delta T_{di}$ from a third time, $t_{3i}=2\Delta T_i$, to a fourth time, $t_{4i}=2(\Delta T_i+\Delta t_{di})$, where $\Delta T_i$ defines a corresponding detecting distance. In this example, the receiver 124 includes a pair of receivers placed at both sides of the transmitter 122. Accordingly, there are time differences and voltage differences between the reflected signals 123r1 and 123r2 received by the pair of receivers. By analyzing the time differences and voltage differences of the reflected signals 123r1 and 123r2, the location and movement (gesture) of the hand of the user are determined.

The transmission of the first acoustic/ultrasonic signal 121 in the first duration $\Delta t_{di}$ and the reception of the reflected signal 123 in the second duration $\Delta T_{di}$ are controlled by a control signal (not shown) generated by the microcontroller 130 shown in FIG. 1. In one embodiment, the control signal has a frequency in a range of about 10 Hz-500 kHz. The control signal is used to drive each acoustic/ultrasonic transducer 120, and configured such that for each period T, the transmitter 122 of each acoustic/ultrasonic transducer 120 is turned on in the first duration $\Delta t_{di}$ to emit the first acoustic signal 121 and turned off in the other time, while the receiver 124 of each acoustic/ultrasonic transducer 120 is turned on in the second duration $\Delta T_{di}$ to receive the reflected (second) signal 121 and turned off in the other time. The first duration $\Delta t_{di}$ and the second duration $\Delta T_{di}$ are not overlapped. In other words, transmitting the first acoustic signal 121 and receiving the reflected signal 123 occur at different times. As such, the received signal is mainly of the signals reflected from the one or more objects, which minimizes or eliminates signal interference from background signals. Additionally, for such a configuration, the power consumption of the plurality of acoustic/ultrasonic transducers 120 can be reduced significantly.

Referring to in FIG. 5, a time sequence control is shown according to one embodiment of the present invention, where the pulse period T=100 ms. For each period T of transducer $X_i$, the first duration $\Delta t_{di}$ is from the initial time, $t_{0i}$, to the first time, $t_{1i}$, of the period, and the second duration $\Delta T_{di}$ is from the third time, $t_{3i}=2\Delta T_i$, to the fourth time, $t_{4i}=2(\Delta T_i+\Delta t_{di})$, of the period, where $\Delta T_i=(t_{2i}-t_{0i})$ and determines an effective distance for one or more objects to be detected in the period, and where $t_{4i} > t_{3i} > t_{2i} > t_{1i} > t_{0i}$. The first duration $\Delta t_{di}$ determines the detection region. For example, as shown in FIG. 5, for each pulse period T=100 ms, the first duration $\Delta t_{di}$ is set from 0 ms to 0.3 ms and $\Delta T_i$ is set from 0 ms to 1.0 ms, and thus, the second duration $\Delta T_{di}$ is set from 2.0 ms to 2.6 ms. Accordingly, the detecting region $\Delta dd_i$ is about 3 cm and the detecting distance $D_i$ is about 34 cm. The front (first) wave of the reflected signal travels from the detecting distance 34 cm back to the receiver at time $t_{3i}$=2.0 ms, while the back (last) wave of the reflected signal travels from the distance of ($D_i$+ $\Delta dd_i$)=44 cm back to the receiver at time $t_{4i}$=2.6 ms. In this example, the detecting distance D is about 34 cm with the detecting range (region) $\Delta dd_i$ of about 3 cm.

Figure 6:
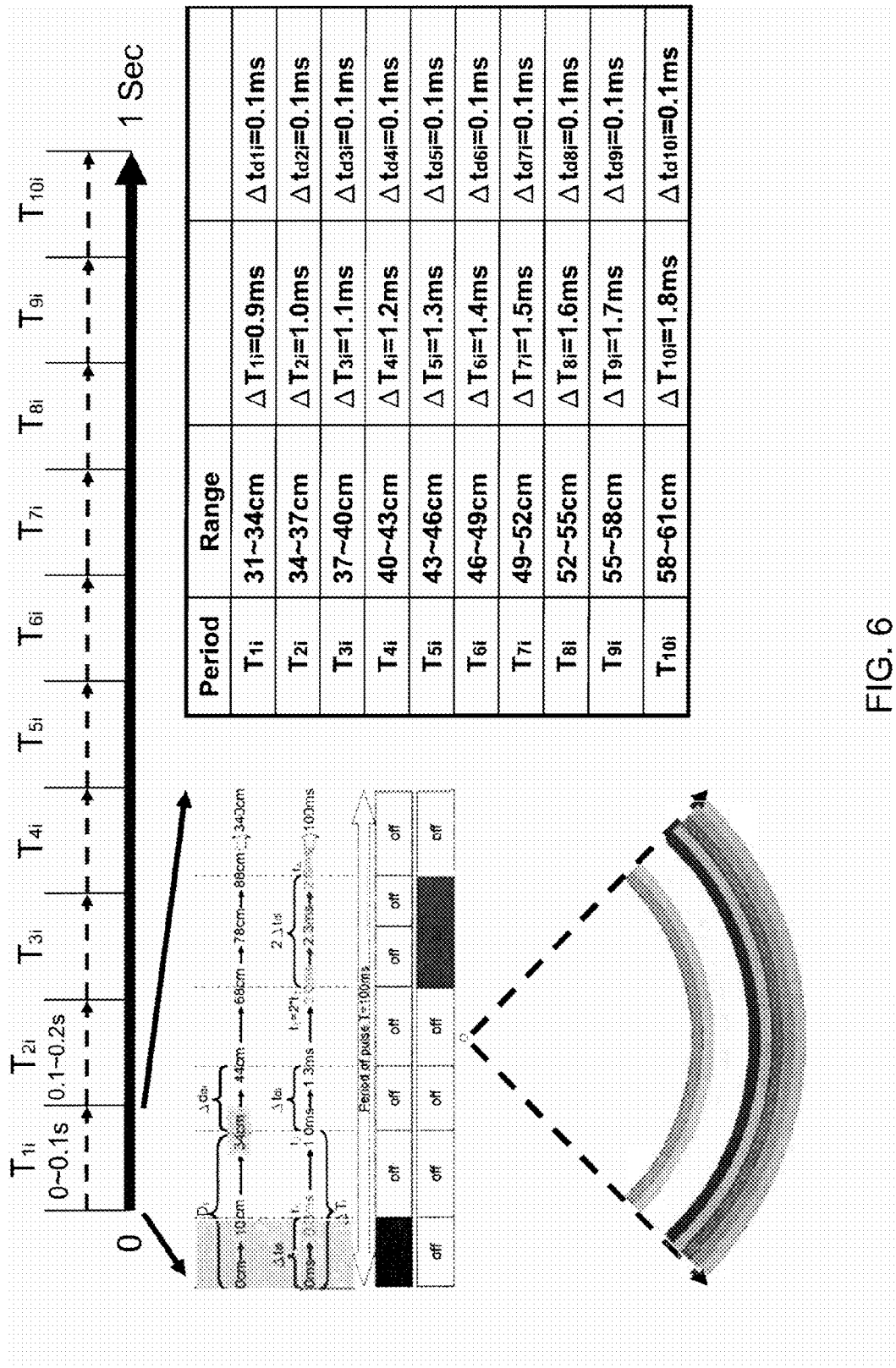
FIG. 6 shows schematically a time sequence control for a display for controlling information display according to another embodiment of the present invention.

In one embodiment, $\Delta T_i$ is set to be different for each period T so as to extend the detecting distance and the effective detecting range. For example, as shown in FIG. 6, the pulse period T=100 ms, i.e., there are ten (10) periods, $T_{1i}$, $T_{2i}$, $T_{3i}$ . . . $T_{10i}$, per second. All the ten periods $T_{1i}$, $T_{2i}$, $T_{3i}$ . . . $T_{10i}$ are the same, $T_{1i}=T_{2i}=T_{3i}$, . . . $=T_{10i}=T=100$ ms. However, in each period, $\Delta T_i$ is set to be different. Preferably, $\Delta T_{1i} > \Delta T_{2i} > \Delta T_{3i}$ . . . $> \Delta T_{10i}$. As an example, $\Delta T_{1i}$=0.9 ms, $\Delta T_{2i}$=1.0 ms, $\Delta T_{3i}$=1.1 ms, . . . $\Delta T_{10i}$=1.8 ms. In addition, $\Delta t_{d1i} = \Delta t_{d2i} = \Delta t_{d3i} = $ . . . $\Delta t_{d10i}$=0.1 ms. Accordingly, the effective detecting range is the first effective detection distance $D_{1i}$ detectable in the first period $T_{1i}$ to the last effective detection distance $D_{10i}$ detectable in the last period $T_{10i}$, which is about 31-61 cm in the example.

Figure 7:
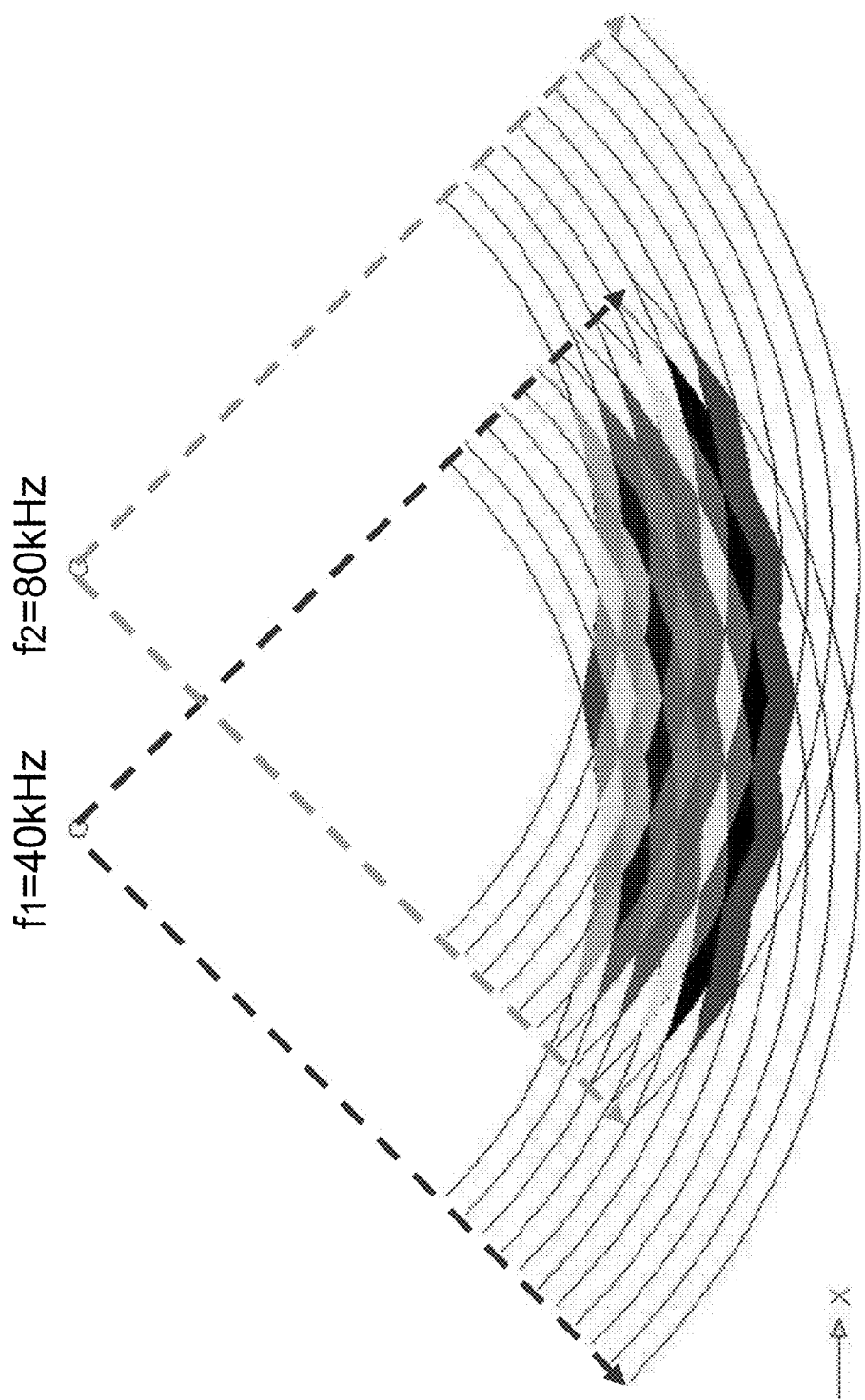
FIG. 7 shows schematically transducers transmitting signals of difference frequencies according to another embodiment of the present invention.

In one embodiment, the transmitter 122 of each acoustic/ultrasonic transducer 120 includes a speaker, and the receiver 124 of each acoustic/ultrasonic transducer 120 includes a microphone. In another embodiment, the acoustic/ultrasonic transducers 120 include MEMS ultrasonic transducers. The first acoustic signal 121 transmitted from the transmitter 122 of each acoustic/ultrasonic transducer 120 has a frequency. The frequency is in an audio frequency range of about 10-20 kHz, or in an ultrasonic frequency range (of greater than 20 kHz). The frequency of each transmitted acoustic signal 124 is the same or substantially different from one another. Each transducer $X_i$ may have an independent frequency band $f_i$ or the same frequency band $f_s$. If the transducer $X_i$ has the same frequency $f_s$, the starting time of every transducer must be synchronized with at least one transducer transmitting the first signal $S1_i$ with the frequency $f_s$. The former is shown in FIG. 6. The latter is shown in FIG. 7, where the first transmitter emits a signal with a frequency of about 40 kHz, and the second transmitter emits a signal with a frequency of about 80 kHz. For such a display having transmitters configured to transmit signals of different frequencies, the detection accuracy can further be improved.

Figure 8:
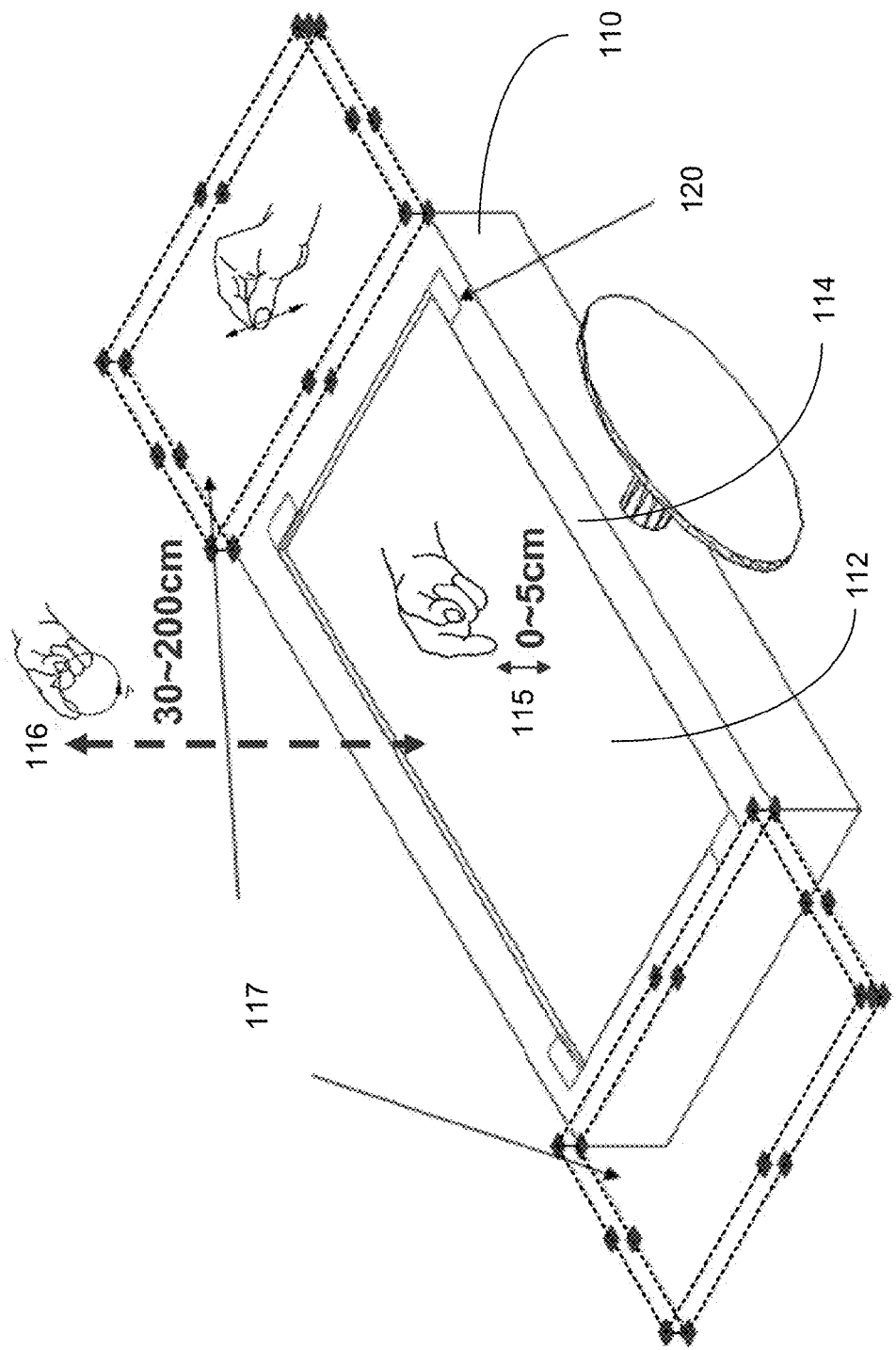
FIG. 8 shows schematically a display panel and transducers imbedded therein according to one embodiment of the present invention.

Since the acoustic/ultrasonic transducers 120 transmit acoustic waves at a transmitting angle of 180°, and there is no limitation of an optical dead angle. Therefore, the control region of the display includes a near field touch region 115 (about 0-5 cm over the display area 112 for detecting X-Y coordinators of an object), a gesture control region 116 (about 30-200 cm front of the display panel 110 for gesture controls) and a non-touch regions 117 (side regions of the display panel 110 for gesture controls), as shown in FIG. 8.

Referring now back to FIG. 1, the microcontroller 130 in communication with the plurality of acoustic/ultrasonic transducers 120 ($\{X_i\}$) for generating the control signal (not shown) having the period of time T to drive the transmitter 122 of each acoustic/ultrasonic transducer 120 to transmit the first signal $S1_i$ in the first duration $\Delta tdi$, and the receiver of each acoustic/ultrasonic transducer to receive the second signal $S2_i$ in a second duration $\Delta T_{di}$, periodically at each period.

The display 100 also includes a digital-analog converter (DAC) 152 coupled to the microcontroller 130 for converting the control signal from a digital format into an analog format, and optionally, a transmitter amplifier 162 coupled between the DAC 152 and each acoustic/ultrasonic transducer 120 ($X_i$) for amplifying the converted control signal and inputting the amplified control signal to each acoustic/ultrasonic transducer 120 ($X_i$), so that the transmitter 122 of each acoustic/ultrasonic transducer 120 ($X_i$) transmits the first signal $S1_i$ in the first duration $\Delta t_d$, and the receiver 124 of each acoustic/ultrasonic transducer 120 ($X_i$) receives the second signal $S2_i$ in the second duration $\Delta Td$ for each period.

In addition, the display 100 also include a receiver amplifier 164 coupled to each acoustic/ultrasonic transducer $X_i$ for amplifying each second signal $S2_i$ received by the receiver 124 of each acoustic/ultrasonic transducer 120 ($X_i$), and an analog-digital converter (ADC) 154 coupled between the microcontroller 130 and the receiver amplifier 164 for converting each amplified second signal $S2_i$ from an analog format into a digital format and inputting each converted second signal $S2_i$ to the microcontroller 130.

Figure 9:
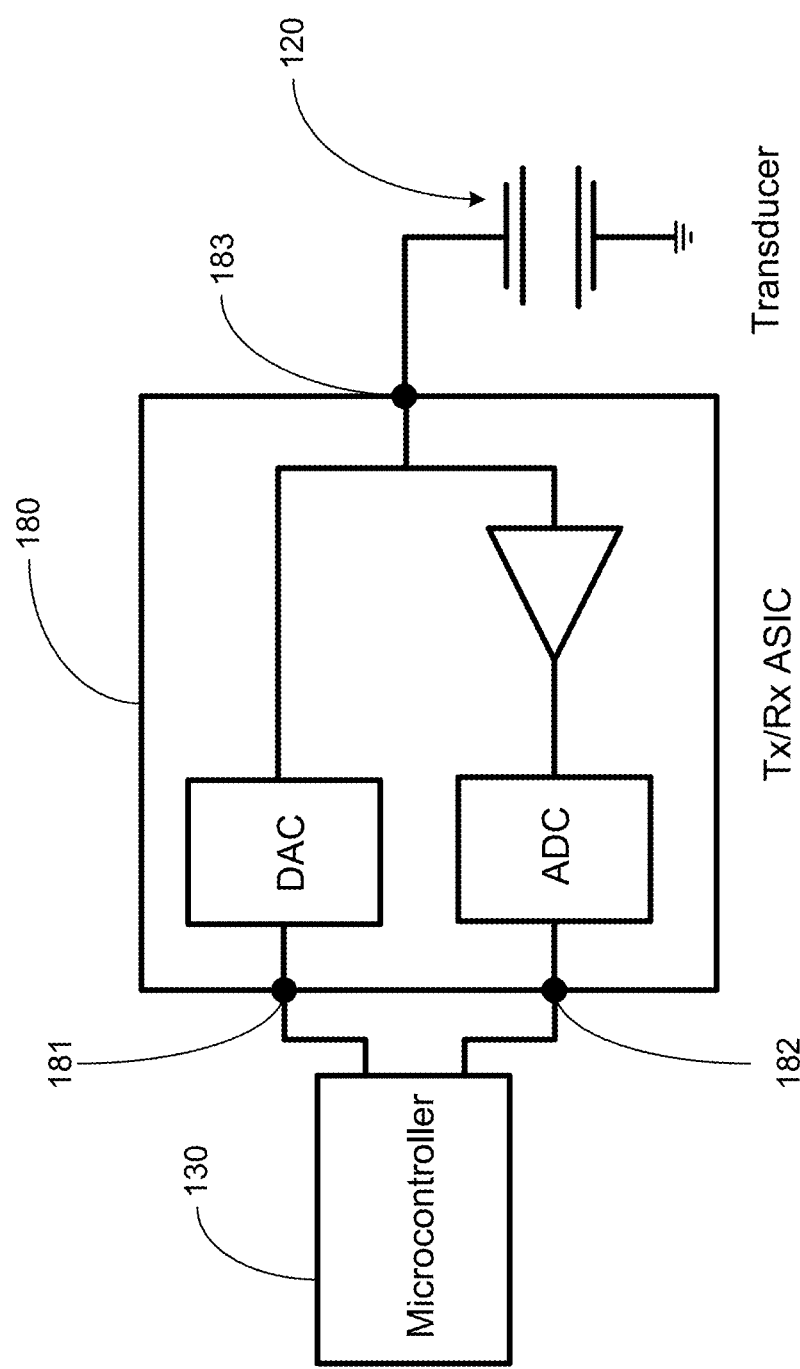
FIG. 9 shows schematically a display for controlling information display according to one embodiment of the present invention.

In one embodiment as shown in FIG. 9, the DAC 152, the ADC 154 and the receiver amplifier 164 can be replaced with an application-specific integrated circuit (ASIC) 180 having a first port 181 and a second port 182 coupled to the microcontroller 130, and a third port 183 coupled to acoustic/ultrasonic transducers 120. The ASIC 180 has a DAC 184 coupled between the first port 181 and the third port 183 for converting the control signal from a digital format into an analog format, and inputting the converted control signal to the acoustic/ultrasonic transducers 120, a receiver amplifier 185 coupled to the third port 183 for amplifying each reflected signal received by the acoustic/ultrasonic transducers 120, and an ADC 186 coupled between the second port 182 and the receiver amplifier 185 for converting each amplified reflected signal from an analog format into a digital format and inputting each converted second signal $S2_i$ to the microcontroller 130.

As shown in FIG. 1, the digital signal processor (DSP) 140 is coupled with the microcontroller 130 for processing the received second signals $\{S2_i\}$ from the acoustic/ultrasonic transducers 120 ($\{X_i\}$) to determine a location and a gesture of the at least one object relative to the display area. In one embodiment, the processor comprises a computer. The display 100 further include an information displaying controller (or graphic controller for screen) 170 in communication with the processor 140 and the display panel 110 for displaying desired information in the display area 112 according to the location and the gesture of the one or more objects.

According to the embodiment of present invention, in the signal processing, the reflected signals received by the receivers of the transducers are retrieved and processed to enhance their resolutions, from which the signals that are reflected from the objects are identified. The distances between the receivers and the objects are obtained from the identified signals reflected from the objects. Then, the 2D and 3D positions of the objects relative to the display panel are obtained by utilizing the geometrical relationship of the distances. Ideally, an acoustic wave reflected from an object has a specific echo envelope. In one embodiment, shapes of the echo envelopes of the reflected acoustic waves are resolved by Laguerre transform and Fisher's linear discriminate analysis (FLDA) techniques. A robust characteristic space (representation) is then developed through the orthonormal Laguerre polynomial approach, which Laguerre coefficients are obtained by different methods. Accordingly, ultrasonic signal descriptors containing correct information of the ultrasonic signals are created, from which an automatic sensing, modeling and classification system for the reflected narrowband ultrasonic signals are established.

Figure 10:
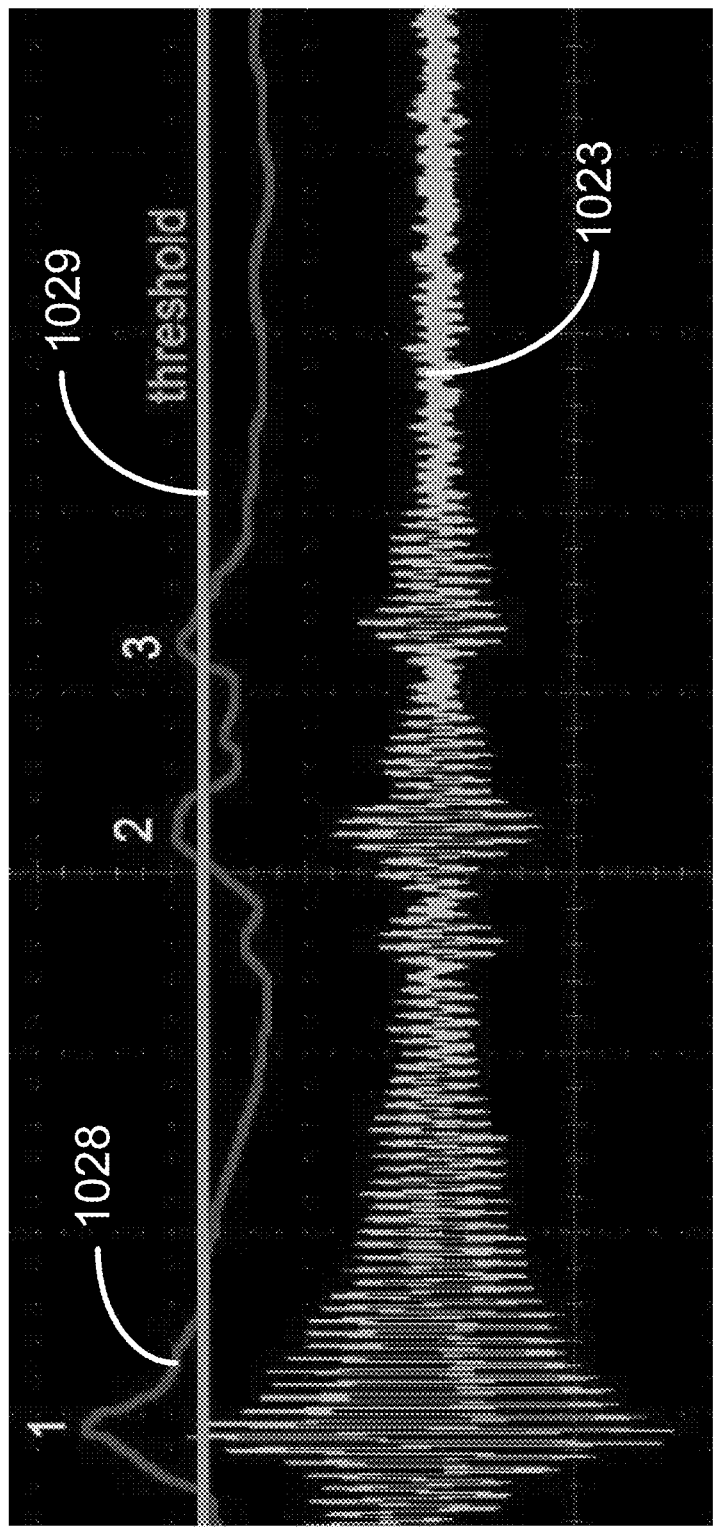
FIG. 10 shows schematically an object-reflected signal detected by a display according to one embodiment of the present invention.

Practically, the ultrasonic signals reflected from the objects carry significant amounts of noises, as shown by the signal 1023 in FIG. 10, which reduces the accuracy of determining the distances between the objects and the transducers. However, according to the present invention, each received object-reflected signal from each acoustic/ultrasonic transducer $X_i$ is correlated to a matched filter using a sliding window protocol. Since the energy and amplitudes of the noises are less than that of the object-reflected acoustic signals, after the matched filter, the output of the noises is much smaller than that of the object-reflected acoustic signals. As shown in FIG. 10, the signal 1028 is output from the matched filter, where the noises are filtered out substantially, while signal peaks "1", "2" and "3" are associated with the three objects, respectively. When the peak values of the output signals 1028 are greater than a predetermined threshold 1029, the peak can be identified as an object. As shown in FIG. 10, three objects are identified by the three peaks "1", "2" and "3" of the output signals 1028.

From the peak signals, the distances $d_i$, of an object to each acoustic/ultrasonic transducer $X_i$ can be obtained. In one embodiment, the distance $d_i$ of the at least one object to each acoustic/ultrasonic transducer $X_i$ satisfies the relationship of:

$$|X-X_i|^2 = X_T X - 2X_i^T X + X_i^T X_i = d_i^2,$$

where $X=[x_i \ y_i]^T$ is the position of the transducer $X_i$, and i is the numeral reference of the acoustic/ultrasonic transducers, and $X=[x \ y]^T$ is the position of the object. For a four transducer system, from the equation (1) of each transducer $X_i$ and its distance $d_i$ to the object, the following relationship is obtained:

$$2 \cdot \begin{bmatrix} (X_1 - X_2)^T \\ (X_2 - X_3)^T \\ (X_3 - X_4)^T \end{bmatrix} \cdot X = \begin{bmatrix} d_2^2 - d_1^2 + X_1^T X_1 - X_2^T X_2 \\ d_3^2 - d_2^2 + X_2^T X_2 - X_3^T X_3 \\ d_4^2 - d_3^2 + X_3^T X_3 - X_4^T X_4 \end{bmatrix}. \quad (2)$$

As long as at least three of the four transducers $X_1$, $X_2$, $X_3$ and $X_4$ are not aligned in a straight line, the equation (2) has only one solution that is in the form of:

$$X = \frac{1}{2} \begin{bmatrix} (X_1 - X_2)^T \\ (X_2 - X_3)^T \end{bmatrix}^{-1} \cdot \begin{bmatrix} d_2^2 - d_1^2 + X_1^T X_1 - X_2^T X_2 \\ d_3^2 - d_2^2 + X_2^T X_2 - X_3^T X_3 \end{bmatrix}. \quad (3)$$

Selecting all possible combinations of the four transducers $X_1$, $X_2$, $X_3$ and $X_4$ like the equation (3) obtains the positions of the object for all the combinations. Ideally, all the positions obtained must be almost the same.

Practically, since the background noises and other factors, errors may exist in the calculated distance $d_i$, of an object to each acoustic/ultrasonic transducer $X_i$. As a result, all the positions obtained for the object may not be the same. If the differences of the obtained positions are not significant, a mean position of the objected can be obtained by averaging the obtained positions.

If the differences of the obtained positions are very significant, the relationship the distance $d_i$, of the object to each acoustic/ultrasonic transducer $X_i$ needs being reexamined. Because the positions of the four ultrasonic transducers are fixed, the object (e.g., finger) is within the detecting region defined by the four ultrasonic transducers, the distance $d_i$, of the object to each acoustic/ultrasonic transducer $X_i$ is constrained. Thus, the distance $d_i$ not obeying the constraint conduction can be deleted or removed in the signal processing, which reduces the number of unreasonable object location points. On the other hand, since the acoustic/ultrasonic transducers transmit multi groups of acoustic signals in very short time intervals, a certain amount of position coordinates of the object can be calculated according to the above disclosed method. By applying statistical methods to the certain amount of position coordinates of the object calculated in the short time intervals, one can obtain a statistical distribution of these position coordinates having the object. When the value of the statistical distribution is greater than a predetermined threshold, the position coordinate is where the object locates. Otherwise, no object is located at the position coordinates. Such a statistical method can also be applied to the identification of multiple objects so as to improve the detection accuracy.

Figure 11:
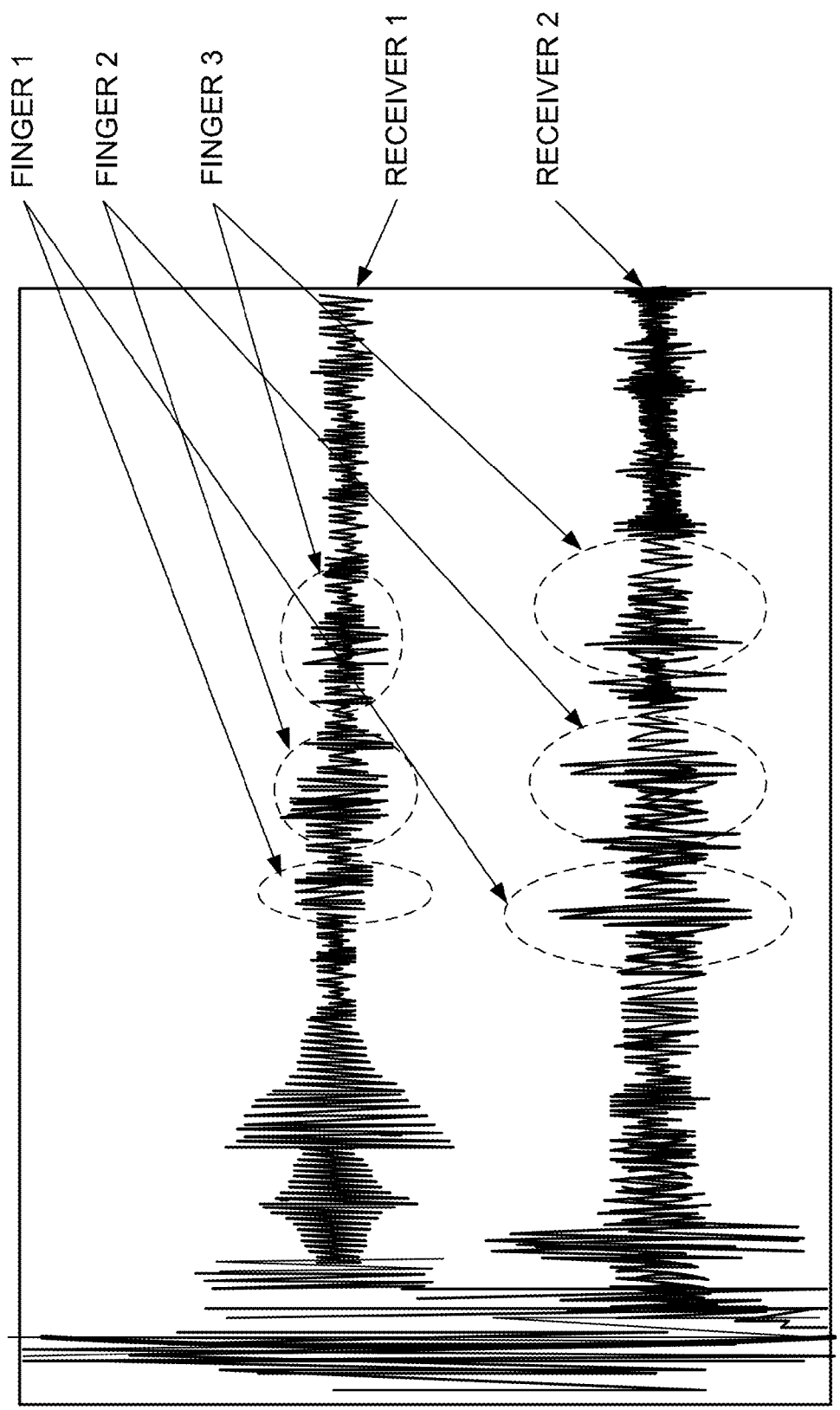
FIG. 11 shows schematically object-reflected signals detected by a display according to one embodiment of the present invention.

FIG. 11 shows the object-reflected signals received by two receivers 1 and 2 in accordance with one exemplary display of the present invention. Each received object-reflected signal is processed according to the method disclosed above, and shows three peaks, which are corresponding to Fingers 1, 2 and 3, respectively.

In one aspect of the present invention, a display with command input function has a display panel for displaying information, the display panel having a display area and a peripheral portion surrounding the display area, a plurality of acoustic/ultrasonic transducers, $\{X_i\}$, arranged at a plurality of selected locations in the peripheral portion, i=1, 2, 3, ... N, N being an positive integer, where each acoustic/ultrasonic transducer $X_i$ is configured to transmit a first signal $S1_i$ in a first duration, $\Delta t_{di}$, and to receive a second signal $S2_i$ in a second duration, $\Delta T_{di}$ periodically at each period, where the second signal $S2_i$ that is reflected from the first signal $S1_i$ by at least one object, and a processor in communication with the plurality of acoustic/ultrasonic transducers $\{X_i\}$ for processing the received second signals $\{S2_i\}$ from the plurality of acoustic/ultrasonic transducers $\{X_i\}$ to determine a location and a gesture of the at least one object relative to the display area.

In one embodiment, each acoustic/ultrasonic transducer $X_i$ comprises a transmitter for transmitting the first signal $S1_i$ and a receiver for receiving the second signal $S2_i$. Each transducer $X_i$ may have an independent frequency band $f_i$ or the same frequency band $f_s$. If the transducer $X_i$ has the same frequency $f_s$, the starting time of each transducer must be synchronized with at least one transducer transmitting the first signal $S1_i$ with the frequency $f_s$. The first signal $S1_i$ transmitted from each acoustic/ultrasonic transducer $X_i$ has a frequency $f_i$ that is identical to or substantially different from one another.

In one embodiment, for each period of transducer $X_i$, the first duration $\Delta t_{di}$ is from an initial time, $t_{0i}$, to a first time, of the period, and the second duration $\Delta T_{di}$ is from a third time, $t_{3i}=2\Delta T_i$, to a fourth time, $t_{4i}=2(\Delta T_i+\Delta t_{di})$, of the period, where $\Delta T=(t_{2i}-t_{0i})$ and determines an effective distance for the at least one object to be detected in the period, where $t_{4i}>t_{3i}>t_{2i}>t_{1i}>t_{0i}$. In one embodiment, $\Delta T_i$ of any one but the first period is longer than that of its immediately prior period so as to define an effective detection range from the first effective detection distance detectable in the first period to the last effective detection distance detectable in the last period.

In another aspect, the present invention relates to a method for controlling a display with command input function, where the display comprises a display panel having a display area and a peripheral portion surrounding the display area, and a plurality of acoustic/ultrasonic transducers, $\{X_i\}$, arranged at a plurality of selected locations in the peripheral portion, i=1, 2, 3, ... N, N being an positive integer.

In one embodiment, the method includes the steps of providing a control signal to drive the plurality of acoustic/ultrasonic transducers $\{X_i\}$ so that each acoustic/ultrasonic transducer $X_i$ transmits a first signal $S1_i$ in a first duration, $\Delta t_{di}$, and receives a second signal $S2_i$ in a second duration, $\Delta T_{di}$ periodically at each period, where the second signal $S2_i$ that is reflected from the first signal $S1_i$ by at least one object, collecting the received second signal $S2_i$ of each acoustic/ultrasonic transducer $X_i$, processing the collected second signal $S2_i$ from each acoustic/ultrasonic transducer $X_i$ to determine a location and a gesture of the at least one object relative to the display area, and displaying desired information in the display area according to the determined location and gesture of the at least one object. The first signal $S1_i$ transmitted from each acoustic/ultrasonic transducer $X_i$ has a frequency $f_i$ that is identical to or substantially different from one another.

One aspect of the present invention relates to an arrangement of acoustic/ultrasonic transducers for object detections in screen content control in a display panel. In one embodiment, the arrangement includes a plurality of acoustic/ultrasonic transducers, $\{X_i\}$, i=1, 2, 3, ... N, N>4. Each acoustic/ultrasonic transducer $X_i$ has a blind area in which no signal is detectable by the acoustic/ultrasonic transducer $X_i$. The plurality of acoustic/ultrasonic transducers $\{X_i\}$ is spatially arranged in one or more sonar bars. The one or more sonar bars are detachably attached to a periphery of the display panel to define an acoustic/ultrasonic transducer array such that the blind areas of at least four acoustic/ultrasonic transducers of the acoustic/ultrasonic transducer array are un-overlapped.

Alternatively, the present invention relates to a sonar bar used for object detections in screen content control in a display panel. In one embodiment, the sonar bar has an enclosure and one or more acoustic/ultrasonic transducers enclosed in the enclosure. The enclosure has one or more shielding film or a shielding case for preventing electromagnetic interference (EMI) of the enclosed one or more acoustic/ultrasonic transducers with the display panel. In use, one or more sonar bars are detachably attached to a periphery of the display panel to define an acoustic/ultrasonic transducer array such that the blind areas of at least four acoustic/ultrasonic transducers of the acoustic/ultrasonic transducer array are un-overlapped.

As such, when an object to be detected is in the blind area of one acoustic/ultrasonic transducer, at least three of the un-overlapped acoustic/ultrasonic transducers are capable of detecting respective distances between the object and the at least three of the un-overlapped acoustic/ultrasonic transducers so as to determine a location and/or gesture of the object relative to the display panel. Such an arrangement is applicable in, for example, TVs, monitors, laptops, vehicle GPS or guiding systems, multimedia players, and so on, for the screen content control.

In one embodiment, the acoustic/ultrasonic transducer $X_i$ has the different frequency band. In the other words, the acoustic/ultrasonic transducer $X_i$ is configured to transmit and received signals which have different frequency band.

In one embodiment, each acoustic/ultrasonic transducer $X_i$ has the same frequency band $f_s$. At least one of the plurality of acoustic/ultrasonic transducers is configured to transmit a first signal $S1$ with the frequency band $f_s$. If two or more transducers are configured to transmit the first signal $S1_i$, the starting time of the two or more transducers are synchronized with each other.

Further, each of the plurality of acoustic/ultrasonic transducers $X_i$ is configured to receive a second signal $S2_i$ that is reflected from the first signal $S1$ by the object. The second signal $S2_i$ received by a respective acoustic/ultrasonic transducer $X_i$ contains information of at least a reflection time, $Tr_i$, a reflection voltage $Vr_i$, and a reflection phase $\Psi r_i$. The reflection time $Tr_i$ is associated with a distance, $d_i$, between the object and the respective acoustic/ultrasonic transducer. The reflection voltage $Vr_i$ is associated with a size of the object or a distance between the object and the display panel. The reflection phase $\Psi r_i$ is associated with a material of the object.

According to embodiments of the invention, by calculating the reflection time $Tr_i$ of each second signal $S2_i$ received by a respective acoustic/ultrasonic transducer $X_i$, a distance $d_i$ between the object and the respective acoustic/ultrasonic transducer is determined. For example, the position X of the object relative to the display panel can be obtained from the at least three un-overlapped acoustic/ultrasonic transducers $X_1$, $X_2$ and $X_3$, which is in the form of:

$$X = \frac{1}{2}\begin{bmatrix}(X_1 - X_2)^T \\ (X_2 - X_3)^T\end{bmatrix}^{-1} \cdot \begin{bmatrix}d_2^2 - d_1^2 + X_1^T X_1 - X_2^T X_2 \\ d_3^2 - d_2^2 + X_2^T X_2 - X_3^T X_3\end{bmatrix}$$

where $X=[x_i \ y_i]^T$ is the position of the acoustic/ultrasonic transducer $X_i$, and $X=[x \ y]^T$ is the position of the object. If the position X of the object is located in a desired sensing position, such an event of touching or movement of the object is considered to be effective.

In addition, by calculating the reflection voltage $Vr_i$ of each second signal $S2_i$ received by a respective acoustic/ultrasonic transducer $X_i$, a size of the object or a distance between the object and the display panel is determined. The latter is corresponding to a position of the object in the z-direction.

Furthermore, a movement and/or gesture of the object is determined by calculating changes of the reflection time, $\Delta Tr_i$, or changes of the reflection voltage, $\Delta Vr_i$, of each second signal $S2_i$ received by a respective acoustic/ultrasonic transducer $X_i$. Such a movement and/or gesture of the object can be utilized to select options of the information display and/or change the position of the cursor. For example, if the object moves forward to the display panel, the reflection time becomes shorter. This indicates a touch event of pushing or a selection of the information display at the cursor. If the object moves backward from the display panel, the reflection time becomes longer. This represents a touch event of releasing or a displacement of the cursor from the information display. Further, moving up or down and/or left or right of the object along the display panel gives rise to the variations of the reflection time $Tr_i$ of each second signal $S2_i$ received by a respective acoustic/ultrasonic transducer $X_i$, which may represent the movements of the cursor, changing of different information displays or selections of different information displays.

Moreover, by calculating derivatives of the reflection time, $(\Delta Tr_i/dt)$, or derivatives of the reflection voltage, $(\Delta Vr_i/dt)$, of each second signal $S2_i$ received by a respective acoustic/ultrasonic transducer $X_i$, a velocity and direction of the movement and/or gesture of the object are determined. Such a velocity vector (i.e., velocity and direction) of the movement and/or gesture of the object can be used to control the speed of information displaying, display selections, or moving of the cursor.

Additionally, by calculating the reflection phase $\Psi r_i$ of one second signal $S2_i$ received by a respective acoustic/ultrasonic transducer $X_i$, the material of the object can be determined. Based on the material of the object, the corresponding information may be displayed in the display panel or a corresponding image of the cursor may be assigned accordingly. For example, a hand-like image is assigned to the cursor if the object is a human finger. As such, the hand-like cursor is used for selections of the information display only. If the object is a pencil, a hand-hold pencil-like image is assigned to the cursor. Accordingly, the hand-hold pencil-like cursor is used for drawing on the display panel.

Figure 12:
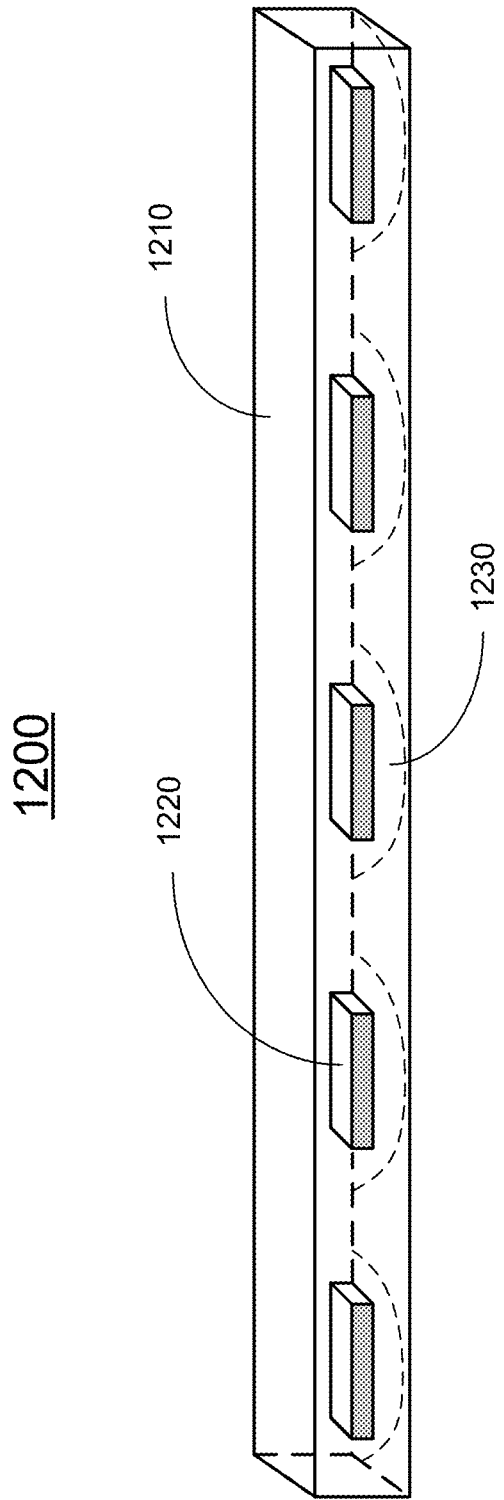
FIG. 12 shows schematically a sonar bar according to one embodiment of the present invention.

Referring now to FIG. 12, a sonar bar 1200 is schematically shown according to one embodiment of the invention. The sonar bar 1200 has an enclosure 1210 and one or more acoustic/ultrasonic transducers 1220 enclosed in the enclosure 1210. Each acoustic/ultrasonic transducer 1220 has a blind area 1230 in which no signal is detectable by the acoustic/ultrasonic transducer. In the exemplary embodiment shown in FIG. 12, five acoustic/ultrasonic transducers 1220 is used, and the enclosure 1210 is a shielding case for preventing electromagnetic interference (EMI) of the enclosed acoustic/ultrasonic transducers 1210 with a display panel. In one embodiment, the enclosure 1220 may have one or more shielding film for preventing the EMI of the enclosed acoustic/ultrasonic transducers with the display panel.

In use, one or more sonar bars are detachably attached to a periphery of the display panel to define an acoustic/ultrasonic transducer array such that the blind areas of at least four acoustic/ultrasonic transducers of the acoustic/ultrasonic transducer array are un-overlapped.

Figure 13:
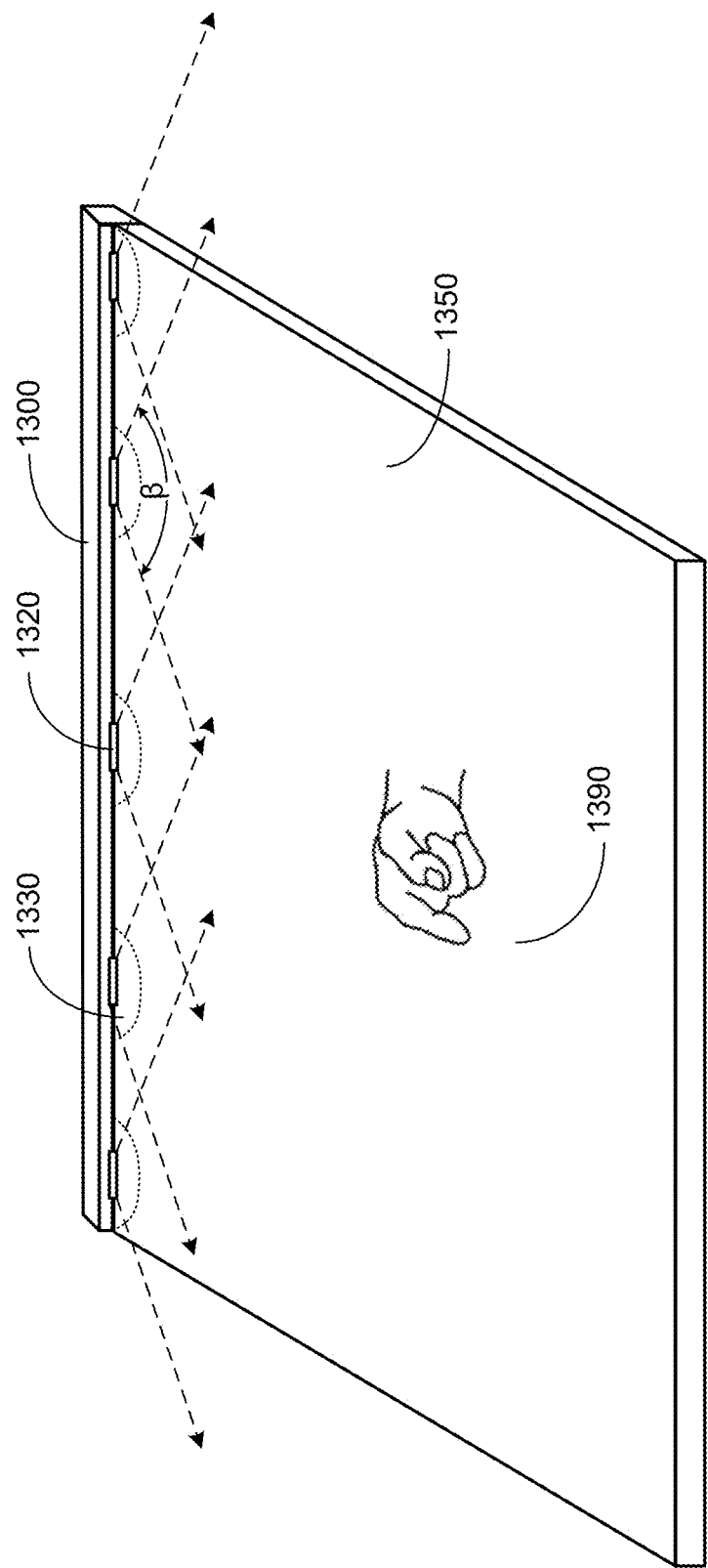
FIG. 13 shows schematically an arrangement of acoustic/ultrasonic transducers in a display panel according to one embodiment of the present invention.

Referring to FIG. 13, one sonar bar 1300 having five acoustic/ultrasonic transducers 1320 is detachably attached to the top side/edge of the display panel 1350 to define an acoustic/ultrasonic transducer array. In the embodiment, the acoustic/ultrasonic transducer array has five acoustic/ultrasonic transducers 1320 aligned a straight line in the disclosure 1310. The blind areas 1330 of the five acoustic/ultrasonic transducers 1220 are not overlapped to each other. Additionally, each acoustic/ultrasonic transducer 1220 has a field of view, indicated by an angle β, which can be of 180 degrees. In practice, one acoustic/ultrasonic transducer transmits a transmitting signal. When the object, such as a human finger 1390, touches or approaches at the display panel 1350, the transmitting signal is reflected by the human finger 1390 to each acoustic/ultrasonic transducer 1220. As discussed above, by processing the reflection signals received by the five acoustic/ultrasonic transducers 1220, the position and/or gesture of the human finger 1390 are determined, so that the information/content is displayed in the display panel 1350 accordingly.

Figure 14:
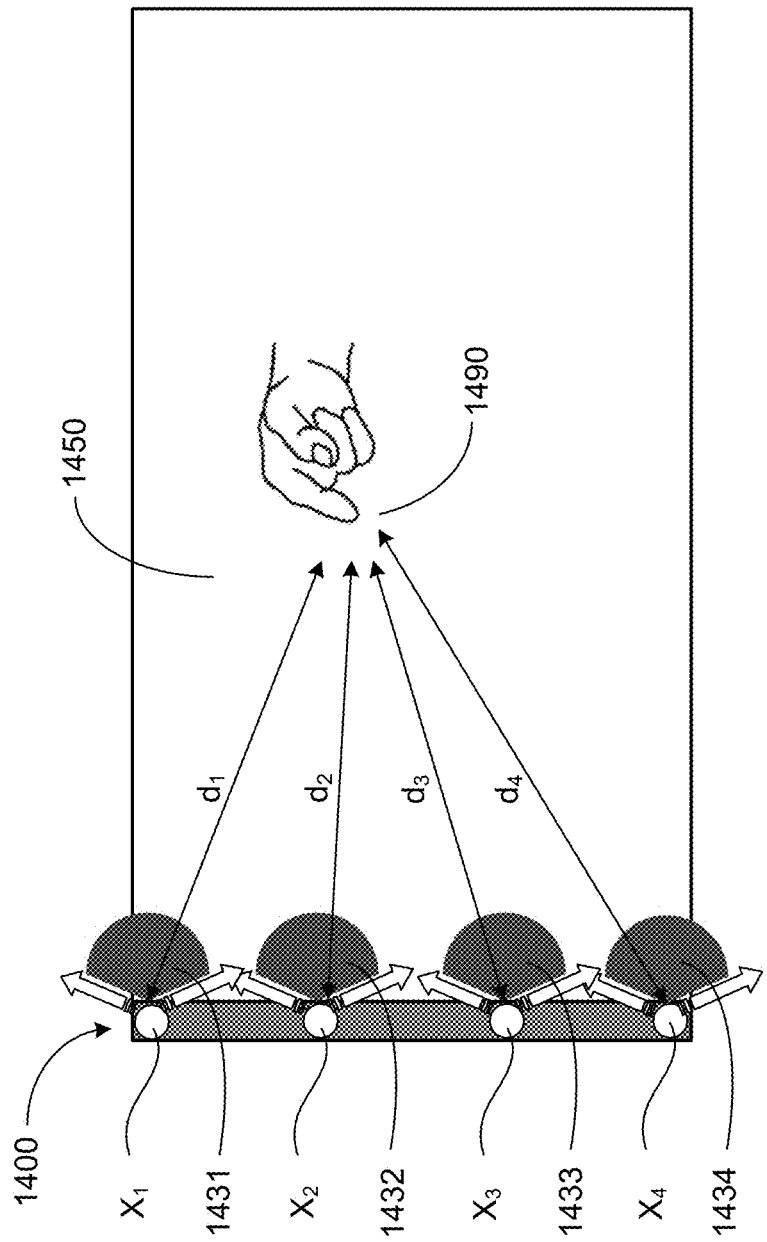
FIG. 14 shows schematically an arrangement of acoustic/ultrasonic transducers in a display panel according to another embodiment of the present invention.
Figure 15:
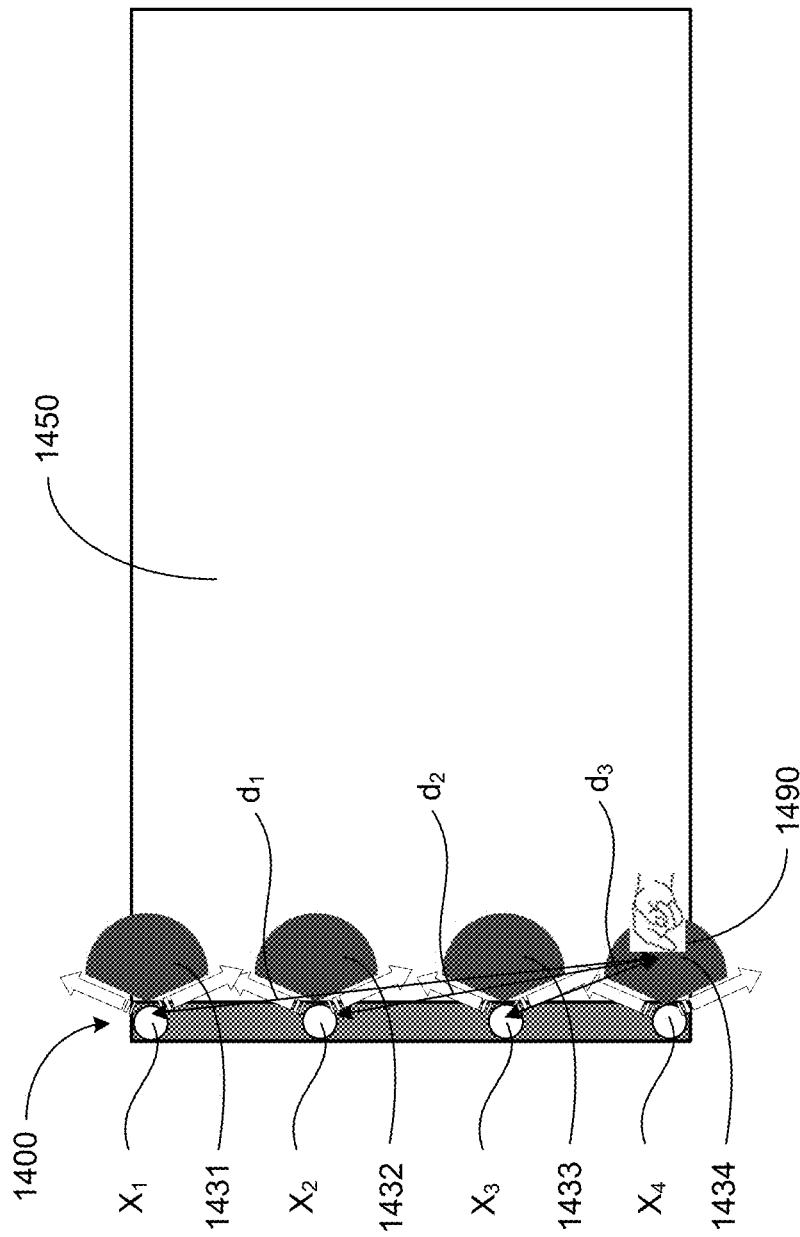
FIG. 15 shows schematically the arrangement of acoustic/ultrasonic transducers shown in FIG. 14.

FIGS. 14 and 15 show another embodiment of the arrangement of acoustic/ultrasonic transducers for object detections in screen content control in a display panel. Similarly, one sonar bar 1400 is used. The sonar bar 1400 is detachably attached to the left side/edge of the display panel 1450, and has four acoustic/ultrasonic transducers $X_1$, $X_2$, $X_3$ and $X_4$. Each acoustic/ultrasonic transducer $X_1$, $X_2$, $X_3$ or $X_4$ has a blind area 1431, 1432, 1433 or 1434. The four blind areas 1431, 1432, 1433 and 1434 are not overlapped to each other.

If the finger 1490 is not in any one of the four blind areas 1431, 1432, 1433 and 1434, as shown in FIG. 14, the distance $d_i$ between the finger 1490 and a respective acoustic/ultrasonic transducer $X_i$ (i=1, 2, 3 and 4) can be obtained by calculating the reflection time $Tr_i$ of the reflection signal received by the respective acoustic/ultrasonic transducer $X_i$. The distance $d_i$ of the object to each acoustic/ultrasonic transducer $X_i$ satisfies the relationship of:

$$|X-X_i|^2 = X^T X - 2 X_i^T X + X_i^T X_i = d_i^2, \quad (4)$$

where $X_i=[x_i\ y_i]^T$ is the position of the transducer $X_i$, and i is the numeral reference of the acoustic/ultrasonic transducers, and $X=[x\ y]^T$ is the position of the object. For such a four transducer system as shown in FIG. 14, the following relationship is obtained from the equation (4) of each transducer $X_i$ and its distance $d_i$ to the object:

$$2 \cdot \begin{bmatrix} (X_1 - X_2)^T \\ (X_2 - X_3)^T \\ (X_3 - X_4)^T \end{bmatrix} \cdot X = \begin{bmatrix} d_2^2 - d_1^2 + X_1^T X_1 - X_2^T X_2 \\ d_3^2 - d_2^2 + X_2^T X_2 - X_3^T X_3 \\ d_4^2 - d_3^2 + X_3^T X_3 - X_4^T X_4 \end{bmatrix}. \quad (5)$$

Since the four blind areas 1431, 1432, 1433 and 1434 are not overlapped to each other, the equation (5) has only one solution that is in the form of:

$$X = \frac{1}{2} \begin{bmatrix} (X_1 - X_2)^T \\ (X_2 - X_3)^T \end{bmatrix}^{-1} \cdot \begin{bmatrix} d_2^2 - d_1^2 + X_1^T X_1 - X_2^T X_2 \\ d_3^2 - d_2^2 + X_2^T X_2 - X_3^T X_3 \end{bmatrix}. \quad (6)$$

Selecting all possible combinations of the four transducers $X_1$, $X_2$, $X_3$ and $X_4$ like the equation (6) obtains the positions of the object for all the combinations. Ideally, all the positions obtained must be almost the same.

If the finger 1490 is located in, for example, the blind area 1434 of the fourth acoustic/ultrasonic transducer $X_4$, as shown in FIG. 15, the distance $d_i$ between the finger 1490 and the first, second and third respective acoustic/ultrasonic transducer $X_i$ (i=1, 2 and 3) is used to determine the position X of the finger 1490, which is governed by equation (6).

Figure 16:
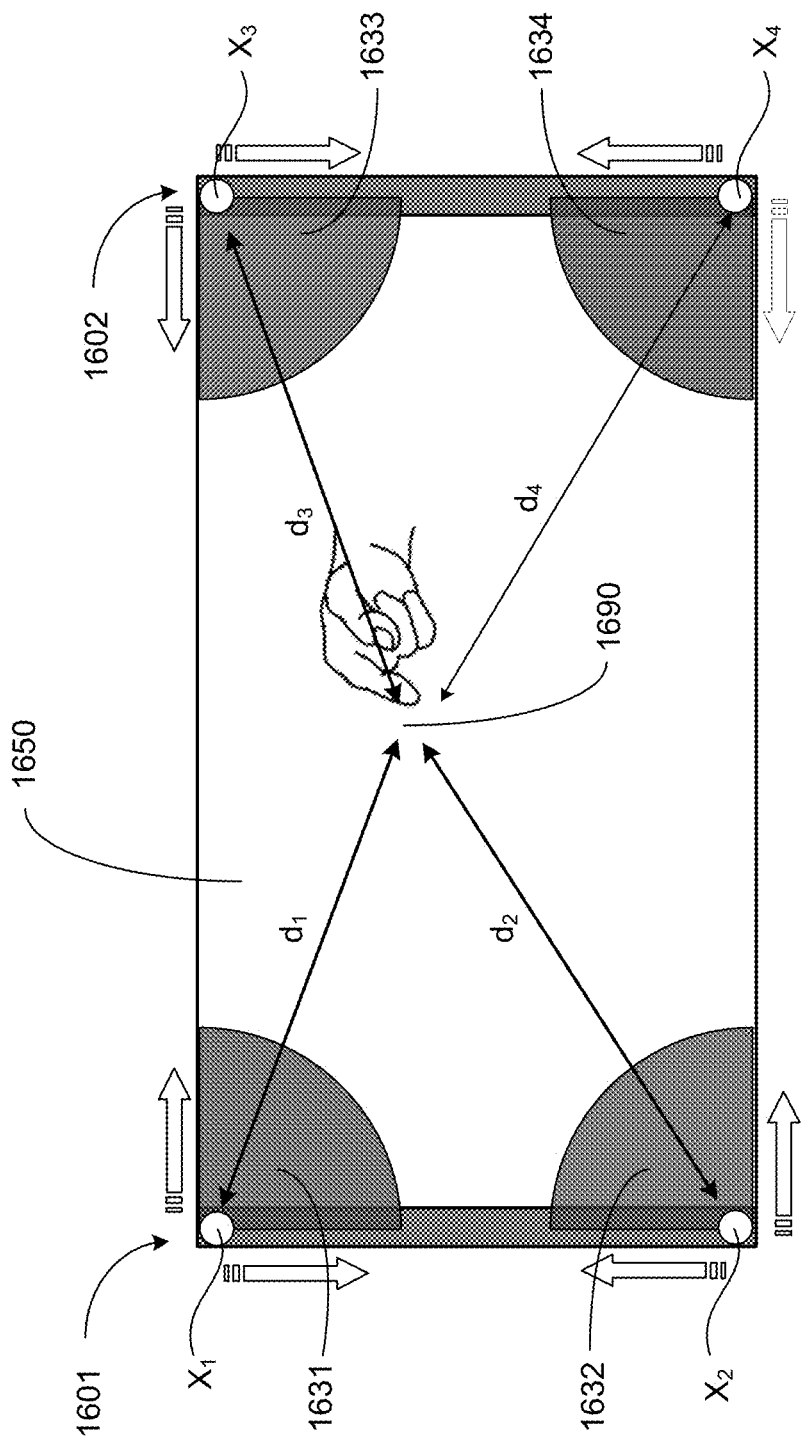
FIG. 16 shows schematically an arrangement of acoustic/ultrasonic transducers in a display panel according to yet another embodiment of the present invention.

Referring to FIG. 16, two sonar bars 1601 and 1602 are utilized for object detections in screen content control in a display panel, according to one embodiment of the invention. Each two sonar bar 1601 (1602) has two acoustic/ultrasonic transducers $X_1$ and $X_2$ ($X_3$ and $X_4$). The two sonar bars 1601 and 1602 are respectively placed in the left and right sides of the display panel 1650, such that no blind areas 1631-1634 are overlapped.

If the finger 1690 is not in any one of the four blind areas 1631, 1632, 1633 and 1634, as shown in FIG. 16, the distance $d_i$ between the finger 1690 and a respective acoustic/ultrasonic transducer $X_i$ (i=1, 2, 3 and 4) can be obtained by calculating the reflection time $Tr_i$ of the reflection signal received by the respective acoustic/ultrasonic transducer $X_i$. The position X of the object is then obtained by using any three of the four distances $d_1$, $d_2$, $d_3$ and $d_4$, which satisfies with the relationship of equation (6).

Otherwise, if the finger 1690 is located in, for example, the blind area 1634 of the fourth acoustic/ultrasonic transducer $X_4$, the three distances $d_1$, $d_2$ and $d_3$ are used to determine the position X of the finger 1490, which is governed by equation (6).

Figure 17:
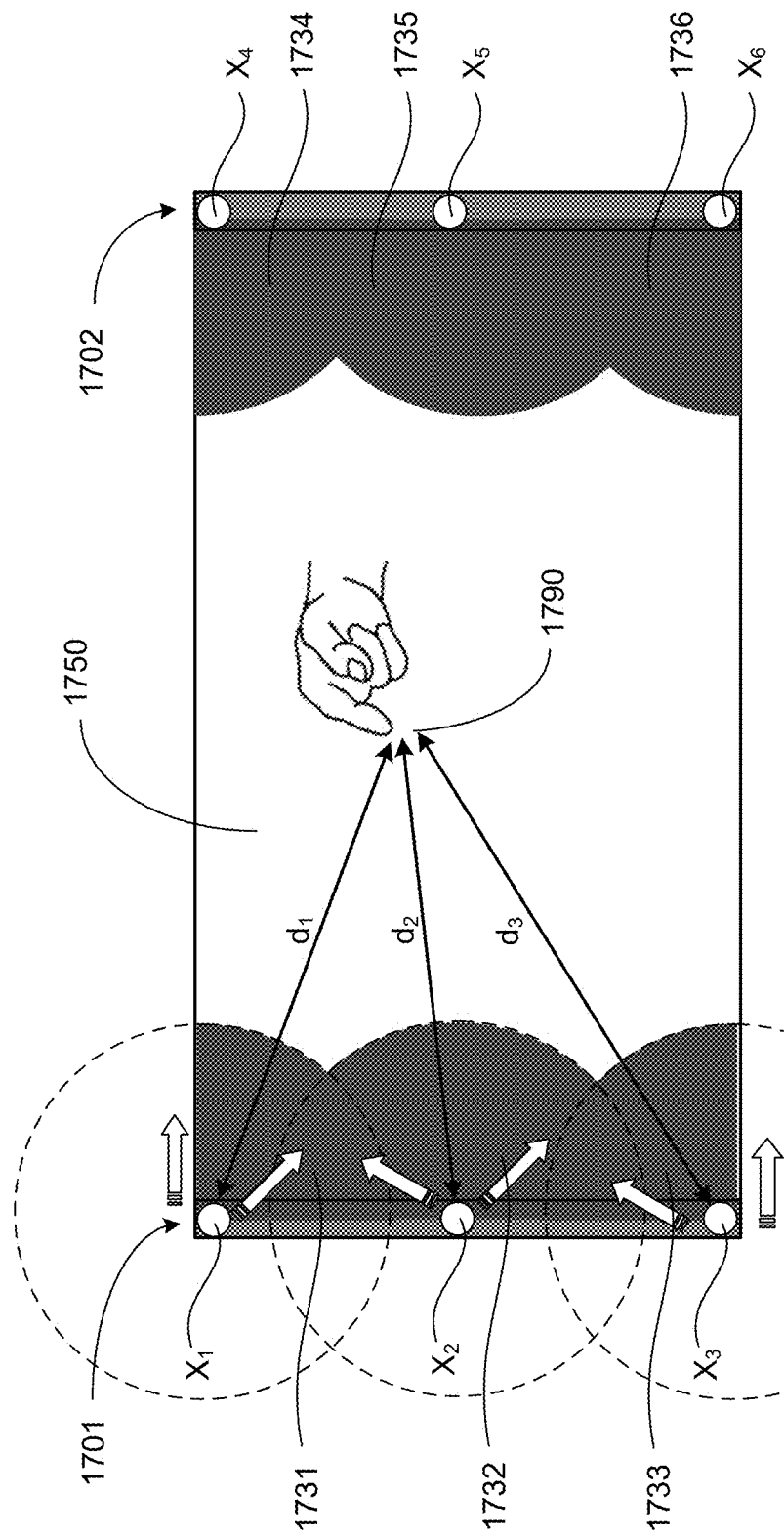
FIG. 17 shows schematically an arrangement of acoustic/ultrasonic transducers in a display panel according to a further embodiment of the present invention.
Figure 18:
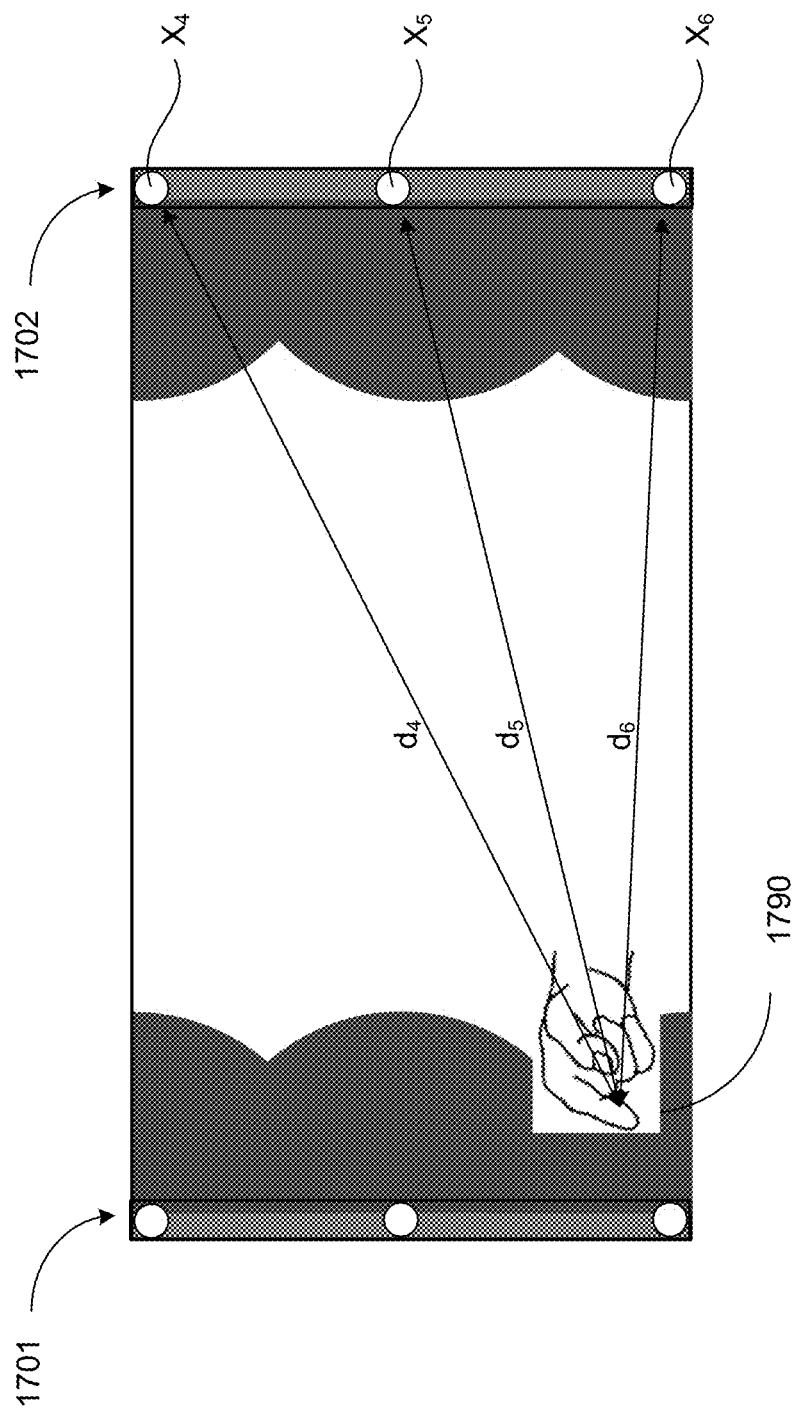
FIG. 18 shows schematically the arrangement of acoustic/ultrasonic transducers shown in FIG. 17.

FIGS. 17 and 18 show one embodiment of the arrangement of acoustic/ultrasonic transducers. In the exemplary embodiment, two sonar bars 1701 and 1702 are utilized for object detections in screen content control in a display panel 1750. Each two sonar bar 1701 (1702) has three acoustic/ultrasonic transducers $X_1$, $X_2$ and $X_3$ ($X_4$, $X_5$ and $X_6$). Similar to the arrangement shown in FIG. 16, the two sonar bars 1701 and 1702 are respectively placed in the left and right sides of the display panel 1750. However, in the sonar bar 1701, the blind area 1731 is overlapped with the blind area 1732 which in turn, is overlapped with the blind area 1733. The blind area 1734 is overlapped with the blind area 1735 which in turn, is overlapped with the blind area 1736 in the sonar bar 1702.

If the finger 1790 is not in any one of the six blind areas 1731-1736, as shown in FIG. 17, any sonar bar 1701 or 1702 can be activated to detect the position of the object 1790. For example, as shown in FIG. 17, the sonar bar 1701 is activated to determine the position X of the finger 1790. In the example, the distances $d_1$, $d_2$ and $d_3$ are calculated from the reflection signals received by the first, second and third acoustic/ultrasonic transducers $X_1$, $X_2$ and $X_3$ of the sonar bar 1701.

If the finger 1790 is located in, for example, the blind area 1733 of the third acoustic/ultrasonic transducer $X_3$ of the sonar bar 1701, the sonar bar 1702 is activated to determine the position X of the finger 1790, as shown in FIG. 18. In the case, the distances $d_4$, $d_5$ and $d_6$ are calculated from the reflection signals received by the fourth, fifth and sixth acoustic/ultrasonic transducers $X_4$, $X_5$ and $X_6$ of the sonar bar 1702.

In another aspect of the present invention, a method for object detections in screen content control in a display panel comprises the steps of spatially arranging a plurality of acoustic/ultrasonic transducers, $\{X_i\}$, in one or more sonar bars detachably attached to a periphery of the display panel to define an acoustic/ultrasonic transducer array, i=1, 2, 3, ... N, N>4, each acoustic/ultrasonic transducer $X_i$ having a blind area, such that the blind areas of at least four acoustic/ultrasonic transducers of the acoustic/ultrasonic transducer array are un-overlapped, configuring at least one of the plurality of acoustic/ultrasonic transducers $X_i$ to transmit a first signal $S1_i$, and each of the plurality of acoustic/ultrasonic transducers $X_i$ to receive a second signal $S2_i$ that is reflected from the first signal $S1_i$ by the object, processing the received second signals $\{S2_i\}$ to determine a location, movement and/or gesture of the object relative to the display area, and displaying desired information in the display panel according to the determined location, movement and/or gesture of the object.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A display capable of detecting at least one object, comprising:
   (a) a display panel for displaying information, the display panel having a display area and a peripheral portion around the display area;
   (b) a plurality of acoustic/ultrasonic transducers, $\{X_i\}$, arranged at a plurality of selected locations in the peripheral portion, i=1, 2, 3, ... N, N being an positive integer, wherein at least one of said acoustic/ultrasonic transducers $X_i$ is configured to transmit a first signal $S1_i$ in a first duration, $\Delta t_{di}$, and to receive a second signal $S2_i$ in a second duration, $\Delta T_{di}$ periodically, wherein the second signal $S2_i$ is reflected from the first signal $S1_i$ by said at least one object;
   (c) a processor in communication with the plurality of acoustic/ultrasonic transducers $\{X_i\}$ for processing the received second signal $S2_i$ to determine a location of the at least one object relative to the display area;
   (d) a microcontroller coupled between the plurality of acoustic/ultrasonic transducers $\{X_i\}$ and the processor for providing a control signal to drive the plurality of acoustic/ultrasonic transducers $\{X_i\}$; and
   (e) an application-specific integrated circuit (ASIC) having a first port and a second port coupled to the microcontroller, and a third port coupled to each acoustic/ultrasonic transducer $X_i$, the ASIC comprising:
      a digital-analog converter (DAC) coupled between the first port and the third port for converting the control signal from a digital format into an analog format, and inputting the converted control signal to each acoustic/ultrasonic transducer $X_i$ so that the transmitter of each acoustic/ultrasonic transducer $X_i$ transmits the first signal $S1_i$ in the first duration $\Delta t_{di}$ and the receiver of each acoustic/ultrasonic transducer $X_i$ receives the second signal $S2_i$ in the second duration $\Delta T_{di}$ for each period;
      a receiver amplifier coupled to the third port for amplifying each second signal $S2_i$ received by the receiver of each acoustic/ultrasonic transducer $X_i$; and
      an analog-digital converter (ADC) coupled between the second port and the receiver amplifier for converting each amplified second signal $S2_i$ from an analog format into a digital format and inputting each converted second signal $S2_i$ to the microcontroller;
   wherein for each period of each of said acoustic/ultrasonic transducers $X_i$, the first duration $\Delta t_{di}$ is from an initial time, $t_{0i}$, to a first time, $t_{1i}$, of the period, an effective time interval $\Delta T_i$ is from the initial time, $t_{0i}$, to a second time, $t_{2i}$, of the period, and the second duration $\Delta T_{di}$ is from a third time, $t_{3i}=2\Delta T_i$, to a fourth time, $t_{4i}=2(\Delta T_i+\Delta t_{di})$, of the period, wherein $t_{4i}>t_{3i}>t_{2i}>t_{1i}>t_{0i}$, wherein the first duration $\Delta t_{di}$ defines a detecting region for the at least one object to be detected in the period, and wherein the effective time interval $\Delta T_i=(t_{2i}-t_{0i})$ determines an effective distance for the at least one object to be detected in the period.

2. A method for controlling a display for detecting at least one object, wherein the display comprises a display panel having a display area and a peripheral portion around the display area, and a plurality of acoustic/ultrasonic transducers, $\{X_i\}$, arranged at a plurality of selected locations in the peripheral portion, i=1, 2, 3, ... N, N being an positive integer, the method comprising the steps of:
   (a) providing a control signal to drive the plurality of acoustic/ultrasonic transducers $\{X_i\}$ so that at least one of the plurality of acoustic transducer $X_i$ transmits a first signal $S1_i$ in a first duration, $\Delta t_{di}$, and receives a second signal $S2_i$ in a second duration, $\Delta T_{di}$, periodically, wherein the second signal $S2_i$ is reflected from the first signal $S1_i$ by said at least one object;
   (b) collecting the received second signal $S2_i$ of at least one of the plurality of acoustic transducer $X_i$;
   (c) processing the collected second signal $S2_i$ to determine a location of the at least one object relative to the display area; and
   (d) displaying desired information in the display area according to the determined location the at least one object;
      wherein for each period of each of said acoustic/ultrasonic transducers $X_i$, the first duration $\Delta t_{di}$ is from an initial time, $t_{0i}$, to a first time, $t_{1i}$, of the period, an effective time interval $\Delta T_i$ is from the initial time, $t_{0i}$, to a second time, $t_{2i}$, of the period, and the second duration $\Delta T_{di}$ is from a third time, $t_{3i}=2\Delta T_i$, to a fourth time, $t_{4i}=2(\Delta T_i+\Delta t_{di})$, of the period, wherein $t_{4i}>t_{3i}>t_{2i}>t_{1i}>t_{0i}$, wherein the first duration $\Delta t_{di}$ defines a detecting region for the at least one object to be detected in the period, and wherein the effective time interval $\Delta T_i=(t_{2i}-t_{0i})$ determines an effective distance for the at least one object to be detected in the period;

wherein the processing step comprises the step of correlating each received second signal $S2_i$ to a matched filter using a sliding window protocol so as to obtain a distance, $d_i$, of the at least one object to each acoustic/ultrasonic transducer $X_i$; and wherein the distance $d_i$ of the at least one object to each acoustic/ultrasonic transducer $X_i$ satisfies the relationship of:

$$|X-X_i|^2 = X^TX - 2X_i^TX + X_i^TX_i = d_i^2,$$

wherein $X_i=[x_i\ y_i]^T$ is the position of the transducer $X_i$, and $X=[x\ y]^T$ is the position of the at least one object, wherein the position X of the at least one object is obtained from three transducers $X_1$, $X_2$ and $X_3$ located in a non-straight line, to be in the form of:

$$X = \frac{1}{2}\begin{bmatrix}(X_1-X_2)^T\\(X_2-X_3)^T\end{bmatrix}^{-1} \cdot \begin{bmatrix}d_2^2-d_1^2+X_1^TX_1-X_2^TX_2\\d_3^2-d_2^2+X_2^TX_2-X_3^TX_3\end{bmatrix}.$$

3. The method of claim 2, wherein the effective time interval $\Delta T_i$ of each period is different from that of its immediately prior period so as to define an effective detection range from the first effective detection distance detectable in the first period to the last effective detection distance detectable in the last period.

4. The method of claim 2, wherein each acoustic/ultrasonic transducer $X_i$ comprises a transmitter for transmitting the first signal $S1_i$ and a receiver for receiving the second signal $S2_i$.

5. The method of claim 4, wherein the control signal is adapted such that for each period, the transmitter of each acoustic/ultrasonic transducer $X_i$ is turned on in the first duration $\Delta t_{1i}$, and the receiver of each acoustic/ultrasonic transducer $X_i$ is turned on in the second duration $\Delta T_{di}$.

6. The method of claim 2, wherein at least one of the first signal $S1_i$ transmitted from each acoustic/ultrasonic transducer $X_i$ has a frequency that is substantially different from one another.

7. An arrangement of acoustic/ultrasonic transducers for object detections in screen content control in a display panel, comprising:

a plurality of acoustic/ultrasonic transducers, $\{X_i\}$, spatially arranged in one or more sonar bars detachably attached to a periphery of the display panel to define an acoustic/ultrasonic transducer array, i=1, 2, 3, . . . N, N≥4, each acoustic/ultrasonic transducer $X_i$ having a blind area, such that the blind areas of at least four acoustic/ultrasonic transducers of the acoustic/ultrasonic transducer array are un-overlapped, whereby when an object to be detected is in the blind area of one acoustic/ultrasonic transducer, at least three of the un-overlapped acoustic/ultrasonic transducers are capable of detecting respective distances between the object and the at least three of the un-overlapped acoustic/ultrasonic transducers so as to determine a location and/or gesture of the object relative to the display panel, wherein at least one of the plurality of acoustic/ultrasonic transducers is configured to transmit a first signal $S1_i$, and wherein each of the plurality of acoustic/ultrasonic transducers $X_i$ is configured to receive a second signal $S2_i$ that is reflected from the first signal $S1_i$ by the object;

wherein the second signal $S2_i$ received by a respective acoustic/ultrasonic transducer $X_i$ contains information of at least a reflection time, $Tr_i$, a reflection voltage $Vr_i$, and a reflection phase $\Psi r_i$, wherein the reflection time $Tr_i$ is associated with a distance, $d_i$, between the object and the respective acoustic/ultrasonic transducer, the reflection voltage $Vr_i$ is associated with a size of the object or a distance between the object and the display panel, and the reflection phase $\Psi r_i$ is associated with a material of the object; and wherein the distance $d_i$ of the object to each acoustic/ultrasonic transducer $X_i$ satisfies the relationship of:

$$|X-X_i|^2 = X^TX - 2X_i^TX + X_i^TX_i = d_i^2,$$

wherein $X_i=[x_i\ y_i]^T$ is the position of the acoustic/ultrasonic transducer $X_i$, and $X=[x\ y]^T$ is the position of the object, and wherein the position X of the object is obtained from the at least three un-overlapped acoustic/ultrasonic transducers $X_1$, $X_2$ and $X_3$, to be in the form of:

$$X = \frac{1}{2}\begin{bmatrix}(X_1-X_2)^T\\(X_2-X_3)^T\end{bmatrix}^{-1} \cdot \begin{bmatrix}d_2^2-d_1^2+X_1^TX_1-X_2^TX_2\\d_3^2-d_2^2+X_2^TX_2-X_3^TX_3\end{bmatrix}.$$

8. The arrangement of claim 7, wherein each sonar bar comprises an enclosure for enclosing one or more acoustic/ultrasonic transducers therein, wherein the enclosure has one or more shielding film or a shielding case for preventing electromagnetic interference (EMI) of the enclosed one or more acoustic/ultrasonic transducers with the display panel.

9. The arrangement of claim 7, wherein a movement and/or gesture of the object is determined by changes of the reflection time, $\Delta Tr_i$, or changes of the reflection voltage, $\Delta Vr_i$, of each second signal $S2_i$ received by a respective acoustic/ultrasonic transducer $X_i$; and a velocity and direction of the movement and/or gesture of the object are determined by derivatives of the reflection time, $(\Delta Tr_i/dt)$, or derivatives of the reflection voltage, $(\Delta Vr_i/dt)$, of each second signal $S2_i$ received by a respective acoustic/ultrasonic transducer $X_i$.

* * * * *